(12) United States Patent
Horne

(10) Patent No.: US 7,058,587 B1
(45) Date of Patent: Jun. 6, 2006

(54) SYSTEM AND METHOD FOR ALLOCATING THE SUPPLY OF CRITICAL MATERIAL COMPONENTS AND MANUFACTURING CAPACITY

(75) Inventor: Martin Horne, Richmond (CA)

(73) Assignee: Manugistics, Inc., Rockville, MD (US)

( * ) Notice: Subject to any disclaimer, the term of this patent is extended or adjusted under 35 U.S.C. 154(b) by 0 days.

(21) Appl. No.: 10/057,983

(22) Filed: Jan. 29, 2002

Related U.S. Application Data

(60) Provisional application No. 60/264,321, filed on Jan. 29, 2001.

(51) Int. Cl.
*G06F 17/60* (2006.01)

(52) U.S. Cl. .............................. 705/7; 705/8
(58) Field of Classification Search ............ 705/8, 705/28, 18, 10, 9, 7; 703/6; 707/12, 8; 709/13
See application file for complete search history.

(56) References Cited

U.S. PATENT DOCUMENTS

| | | | | |
|---|---|---|---|---|
| 4,887,206 A | * | 12/1989 | Natarajan | 705/29 |
| 5,148,365 A | * | 9/1992 | Dembo | 705/36 |
| 5,193,065 A | * | 3/1993 | Guerindon et al. | 700/106 |
| 5,630,070 A | | 5/1997 | Dietrich et al. | 395/208 |
| 5,963,919 A | * | 10/1999 | Brinkley et al. | 705/28 |
| 6,006,196 A | * | 12/1999 | Feigin et al. | 705/10 |
| 6,049,742 A | | 4/2000 | Milne et al. | 700/99 |
| 6,086,619 A | * | 7/2000 | Hausman et al. | 703/6 |
| 6,101,479 A | * | 8/2000 | Shaw | 705/8 |
| 6,157,915 A | | 12/2000 | Bhaskaran et al. | 705/7 |
| 6,216,109 B1 | | 4/2001 | Zweben et al. | 705/8 |
| 6,219,649 B1 | * | 4/2001 | Jameson | 705/8 |
| 6,272,389 B1 | * | 8/2001 | Dietrich | 700/101 |
| 6,625,616 B1 | * | 9/2003 | Dragon et al. | 707/104.1 |
| 6,684,193 B1 | * | 1/2004 | Chavez et al. | 705/8 |
| 2002/0013721 A1 | | 1/2002 | Dabbiere et al. | 705/7 |
| 2002/0019761 A1 | | 2/2002 | Lidow | 705/10 |
| 2002/0049625 A1 | | 4/2002 | Kilambi et al. | 705/9 |

FOREIGN PATENT DOCUMENTS

JP 200085925 A * 3/2000

OTHER PUBLICATIONS

Mathur, Kamlesh and Solow, Daniel, "Management Science", 1994, Prentice Hall.*

(Continued)

*Primary Examiner*—Tariq R. Hafiz
*Assistant Examiner*—Catherine M. Colón
(74) *Attorney, Agent, or Firm*—Hogan & Hartson LLP

(57) ABSTRACT

The present invention allocates the supply of critical components and manufacturing capacity by optimizing critical material planning decisions and dynamically allocating constrained materials using advanced substitution logic that considers alternate suppliers and supports product life cycle from design through end-of-life. The present invention may utilize unique synchronized allocations and matched sets logic. The synchronized allocations ensure that all materials necessary for production are available in the appropriate time-phased allocation before beginning production to minimize wasted production capacity and materials. The supply system may include various combination of components, including a Supply Planner, a Resource Optimizer, a Constraint Based Master Planner, a Product Change Analyzer, a Comparer, a Resource Requirements Planner, a Finite Resource Planner, a Customer Promiser, and an Interactive Master Scheduler. Another embodiment of the supply system includes a tool that allows users to define products using engineering specifications.

25 Claims, 12 Drawing Sheets

OTHER PUBLICATIONS

Vollmann, Thomas E., Berry, William L., and Whybark, D. Clay, Manufacturing Planning and Control Systems, 1997, Irwin/McGraw-Hill.*

International Search Report, International Application No. PCT/US02/02371, mailed Sep. 17, 2002.

"Thru-Put Corporation Delivers e-Business Version of Supply Chain Planning Solution" Mapics, Inc. Press release, Sep. 1, 2000, [retrieved on Jun. 15, 2002], Retrieved from the Internet: www.mapics.com/mediacenter/00release/pr-thruput51.asp.

S.C. Feng, "Manufacturing Planning and Execution Software Interfaces" Journal of Manufacturing Systems, vol. 19, No. 1, 2000.

* cited by examiner

SYSTEM AND METHOD FOR ALLOCATING THE SUPPLY OF CRITICAL MATERIAL COMPONENTS AND MANUFACTURING CAPACITY

RELATED APPLICATIONS

This application claims priority from U.S. Provisional Application No. 60/264,321, filed Jan. 29, 2001, the disclosure of which is hereby incorporated by reference in its entirety.

FIELD OF THE INVENTION

The present invention disclosed herein relates to a system and method for allocating the supply of critical material components and manufacturing capacity. More particularly, the present invention pertains to a system and method for optimizing the supply of critical material components and manufacturing capacity in an automated electronic environment.

BACKGROUND OF THE INVENTION

Many companies experience manufacturing delays, higher material costs, and poor customer service when the right materials are not available when and where they are needed. A solution that optimizes material planning and control based on product life cycles, customer-specific needs, and manufacturing plans and schedules is key to addressing these issues.

A challenge faces businesses having products that utilize the same critical material components but not have enough of those components to satisfy all product demand. An ideal material resource planner (MRP) would allow users to utilize those components in the best product mix to support the user's business goals. Furthermore, the ideal MRP should provide time-phased material availability and dynamic part/ingredient substitution and allocation to reduce work-in-process (WIP) inventory. The ideal MRP should also enable users to position the right materials effectively to support customer service and profitability. The ideal MRP should also allow users to manage and reduce the costs associated with those actions.

However, known MRPs allocate scarce parts to fulfill future orders regardless of shortage conditions for other parts that prevent completion of the order. This approach unnecessarily ties up inventory that could be used on other orders using the same parts. In addition, a traditional MRP allocates parts according to date priorities and is generally incapable of creating a plan that recognizes other priorities or directly supports period business objectives.

Existing supply chain management techniques use linear programming to maximize profits in view of various constraints, such as expected sales volumes, prices, and costs. However these techniques do not address other factors such as desired customer service levels, margin levels or inventory levels. Moreover, none of the known techniques allow a user to selectively weigh these factors as needed and desired.

SUMMARY OF THE INVENTION

In response to these and other needs, the present invention provides a system and method for allocating the supply of critical material components and manufacturing capacity. The supply allocation system and method of the present invention optimize critical material planning decisions and dynamically substitute and allocate constrained materials. The result is a quick and dramatic reduction in cycle time and material costs with increased service and market share. Unlike other material planning solutions, the supply allocation system and method support detailed bills-of-materials (BOMs) and optimize the use of constrained materials through advanced substitution logic that considers alternate suppliers and supports the complete product life cycle from design through end-of-life. To overcome the problems and limitations of conventional MRP logic, the supply allocation system and method of the present invention employ unique synchronized allocations and matched sets logic.

In the supply system and method, synchronized allocations ensure that all necessary materials for production of a product are available in the appropriate time-phased allocation before beginning production to help ensure that production and materials are not wasted on products that cannot be completed. With the supply system and method, time-based needs from distribution, production, or customer order are brought together across multiple of internal and external networks. The user can balance constrained material needs against production or current supplier commitments and evaluate potential shortages for substitution. The supply system and method explore substitution and allocation alternatives simultaneously in real-time and contact supplier alternatives via the Internet for availability. The user can scan purchasing alternatives and rules for cost reduction opportunities and automatically incorporate the resulting decisions into appropriate planning and enterprise transaction systems.

The present invention further allows users to increase customer service and cut purchasing and expediting costs by optimizing critical material planning decisions, allowing dynamic material substitutions and allocations, and enabling more profitable use of constrained materials.

The supply system may include various combinations of components including, a Supply Planner, a Resource Optimizer, a Constraint-Based Master Planner, a Product Change Analyzer, a Comparer, a Resource Requirements Planner, a Finite Resource Planner, a Customer Promiser, and an Interactive Master Scheduler. In this way, the supply system provides the user with a flexible, yet powerful, approach to supply chain management. The core of the simulation process is the Supply Planner. Other components, such as the Resource Optimizer and the Comparer, then perform their analyses on the already processed output of the Supply Planner. That is, the Resource Optimizer, and Comparer use the results of a supply plan run as the input data for hypothetical planning and analysis. Subsequently, other components such as the Resource Requirements Planner and the Finite Resource Planner use the combined results from the Supply Planner and another component such as the Resource Optimizer to produce other findings.

Other embodiments of the supply system include "Smart-BILL" substitution to increase responsiveness; synchronized allocations to maximize inventory use; matched sets logic to prevent unnecessary work-in-progress; "Can Build" analysis to minimize parts obsolescence; and configuration alternatives to increase customer service.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE PREFERRED EMBODIMENT

The present invention provides a system and a related method for allocating the supply of critical material components and manufacturing capacity. Referring now to FIGS. 1A–1D, one aspect of the present invention is an apparatus for allocating the supply of critical material components and manufacturing capacity (hereafter supply system 100). In its various embodiments, the supply system 100, generally a real-time response system, is a collection of applications, software tools, and analysis capabilities that enable manufacturers to respond quickly and effectively to the challenges that can make or break their business. The supply system 100 provides all the capabilities necessary to meet these requirements. Specifically, the supply system 100 supports three distinct aspects of the manufacturing planning and control process-proactive planning, reactive decision making, and analysis for special projects and process improvements. A user can, with the help of the supply system 100, respond to new and unexpected sales opportunities and supply problems with speed and accuracy; incorporate capacity planning; eliminate excess and obsolete inventory; reduce active inventory while maintaining a high level of customer service; respond, in real-time, to what-if situations, preparing the user for almost any change in the her business, from global planning to detailed manufacturing operations; and reduce order-fulfillment cycle times.

The supply system 100 can help the user answer critical business questions by interpreting the information buried in the user's host Manufacturing Resource Planning (MRPII) or Enterprise Resource Planning (ERP) system. The supply system 100 gives materials, production, and procurement managers the ability to simulate and analyze the impact of any opportunity or problem in the manufacturing environment. The supply system 100 helps the user look ahead to prepare for any changes in demand, supply, product, costs, and planning policies. The supply system 100 also lets the user slice, dice, and filter data down to the lowest level of manufacturing detail.

Figure 1A:
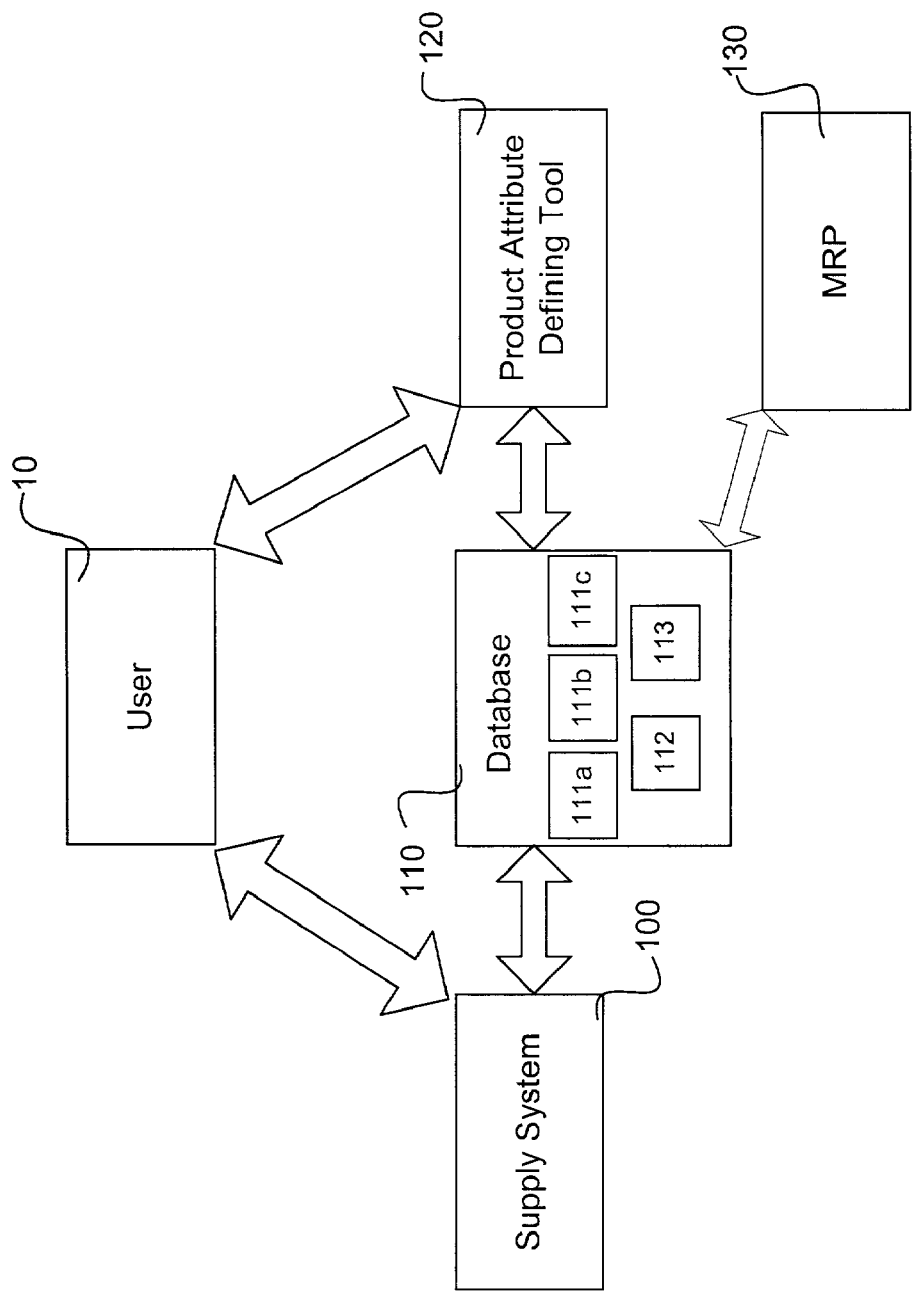
FIGS. 1A–1D illustrate block diagrams of a supply allocation system in accordance with embodiments of the present invention.
Figure 1B:
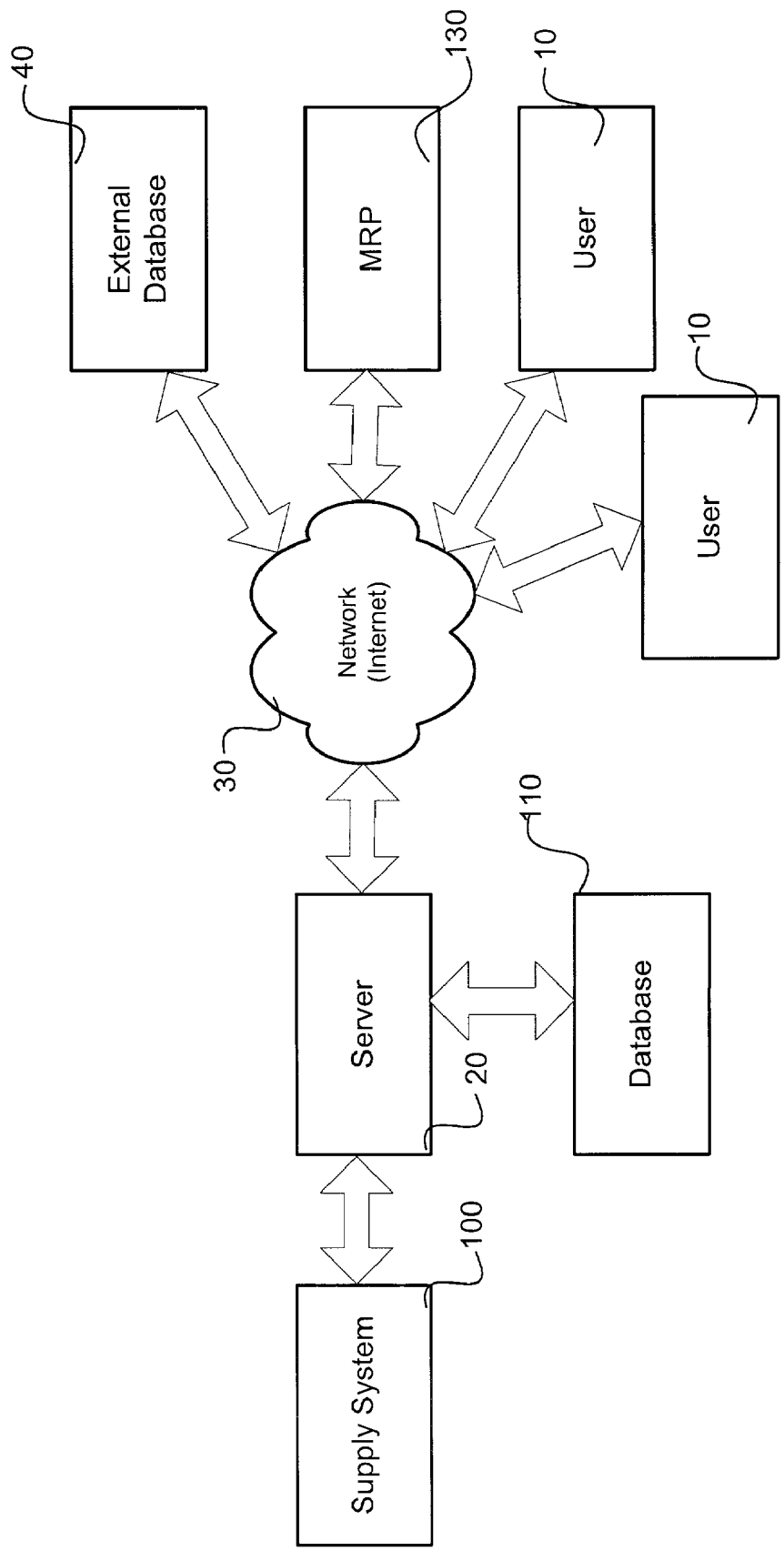

The interaction between supply system 100, a user 10 and other apparatus is depicted in FIGS. 1A–1B. Referring now to FIG. 1A, the user 10 may interact directly with the supply system 100 using numerous known means. For instance, the supply system 100 may be a software application residing on a computing device (not illustrated) to which the user 10 may input data using standard input devices such as a keyboard or mouse. Likewise, the user 10 may receive output data from the supply system 100 through a video monitor or other type of known output device. It should be appreciated that the user 10 may obviously interact with the supply system 100 using any other types known input/output (I/O) devices.

As illustrated in FIG. 1B, the user 10 may also access the supply system remotely via a network 30. Specifically, a server 20 may allow the user 10 to remotely access the supply system 100 using know networking configurations. The supply system 100 may likewise connect to remote applications such as a MRP 50 or a remote data storage device 40. The network 30 may be selected from numerous know technologies such as, intranets, internets, the Internet, and WANs.

Continuing with FIGS. 1A–1B, the supply system 100 functions through the analysis of supply-related data stored in a storage device, hereafter database 110. In the description of the present invention, the term "database" is intended to be defined broadly as any collection of information organized such as to allow a computer program to locate and access select pieces of data. The creation of the database 110 and analysis of this data may be implemented as described in the co-owned application, U.S. Ser. No. 09/984,327 for SYSTEM AND METHOD FOR OPTIMIZING RESOURCE PLANS filed on Oct. 29, 2001 by Shekar et al., herein incorporated by reference in full. The database 110 and the supply system 100's analysis of the database 110 are described in greater detail below.

The supply data stored in the database 110 generally describe the attributes of the supply to be managed by the supply system 100. Specifically, the supply data include information such as the current inventory of the supply, expected increases to the supply inventory (such as new shipments), and expected reductions in the supply inventory (such as the use of the supply in the creation of a product).

The supply system 100 is designed with a standard package of system tables in the database 110. Generally, the user may manipulate the data in the system tables but cannot alter their structure or internal relationships. As illustrated in FIG. 1A, the system tables in the database 110 are organized into categories of three main types of data: Input data 111 imported from a host MRP system 130; user-defined input data 112 defined and manipulated by the user; and output data 113 resulting from the supply system 100 and operations by the user. Each of the system table types is discussed in greater detail below.

Figure 1C:
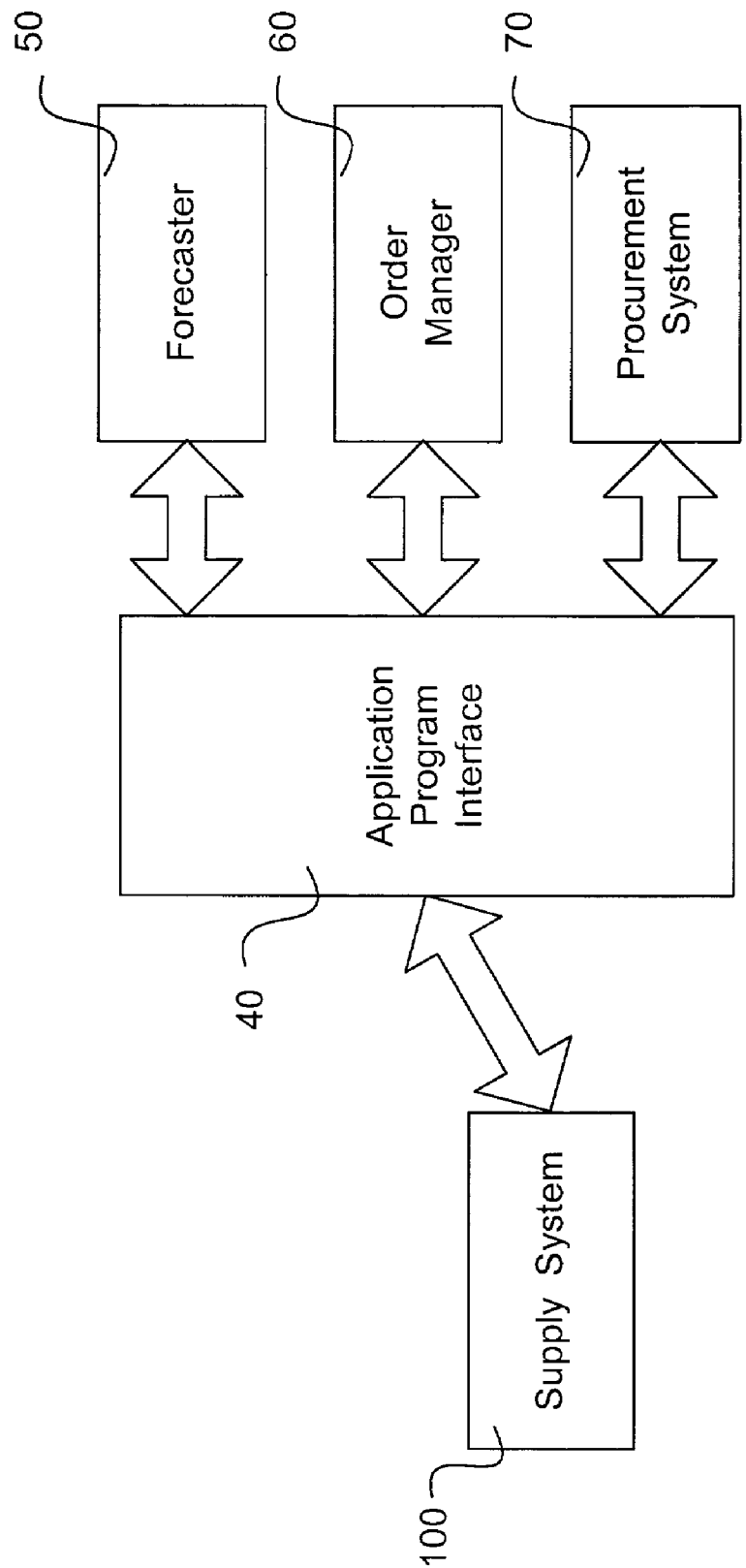

As depicted in FIG. 1C, the supply system 100 may integrate with a know Material Requirements Planning (MRP) system 130. An MRP system 130 is a production and inventory planning system specifically designed to handle dependent demand inventory items. This MRP system 130 enables businesses to reduce inventory levels, utilize labor and facilities better, and improve customer service. In particular, the MRP system 130 generally provides a better forecast of component requirements based on the production schedules of the parent item. The MRP system 130 further provides managers with useful information for estimating financial requirements such as material purchases. Likewise, the MRP system 130 may automatically update the replenishment schedules of dependent demand items when production schedules change for their parent items. Known MRP systems are produced, inter alia, by BAAN, PeopleSoft, JDE, SAP, SSA, and Marcam.

As depicted in FIG. 1C the supply system 100 may receive data from these external systems and use this imported data in the creation of the supply plan. For instance, the supply system 100 may receive demand data in the form of customer orders using an application protocol interface (API) 40. Specifically, the API 40 allows the supply system 100 to accept order information from a secondary order management system 60 that enables customer service representatives to take orders, check the availability of ordered items, promise orders, and commit customer orders. Likewise, after supply plans are generated by the supply system 100, the supply system 100 may provide them to the order management system 60 systems that will actually meet the demand by making, shipping, buying, and selling products.

In a preferred embodiment, the API 40 in the supply system 100 allows users to access a source of data contained in an Oracle® database. The API 40 allows the user to do planning with Oracle-optimized tables and fields. The API 40 extracts data from an Oracle database for use with supply system 100. The user can extract a standard set of information or can use the API 40 to customize the data set prior to extracting it from an Oracle database. The API 40 assists the user in utilizing the enterprise data repository of Oracles' ERP (™) system as the preferred data source for planning; providing high-speed planning and optimization capabilities to enhance customer service, market responsiveness, and financial performance; taking advantage of a constraint-based planning engine to help guide intelligent planning decisions; utilizing flexible data-mining capabilities that allow users to investigate, analyze, and evaluate their source manufacturing data; enhancing engineering changes and new product-introduction planning methods; comparing multiple-scheduling scenarios and selecting the best option, based on business goals; and better analysis of complex product structures.

Continuing with FIG. 1C, the supply system 100 may similarly receive a SKU forecast, i.e., a projection of future demand for a particular product, from an integrated demand forecasting component or from another demand forecasting system 50. A representative demand forecasting system is NetWORKS Demand™, marketed by the owner of the present application. In one embodiment, the supply system 100 may use the demand forecaster to forecast future orders and may use these forecast to help reserve a minimum amount of inventory (or safety stock) of components based on a safety stock rule for the SKU specified by the user. The supply system 100 may also include a demand tool that allows the user to map demand information in Supply and Demand. It provides the flexibility for clients to avoid the restrictions that would otherwise force the demand (forecasting) view to be equivalent to the manufacturing (supply source) view. The demand integration tool allows the user to use forecast information in the user's Supply Plans. It does this by mapping Demand Forecasting Units (DFUs) to stockkeeping units (SKUs). Once this is done, the supply system 100 can use forecast data for the user's material and production planning, providing the user with a more complete picture of the user's situation. A stockkeeping unit (SKU) is an item used for inventory and production purposes and is defined as "existing at a location". A SKU can be a finished good, or component of a finished good that is manufactured, or stored. It can also be grouped according to an organization's manufacturing processes. Location can be a physical location for storage or manufacturing that exists as a plant or warehouse. In contrast, a Demand Forecast Unit (DFU) is a demand source that is also defined by items and locations but is further distinguished, for example, by finished parts that are sold to a customer, specific physical locations that represent discrete end sales, or represent account and distribution channels.

Likewise, the supply system 100 may interact with a procurement system 70. Using the supply system 100 with a Procurement system 70 gives buyers and suppliers the opportunity to realize significant benefits in the areas of sourcing, purchasing, and supplying parts. A representative procurement system is NetWORKS Procurement™, marketed by the owner of the present application. A procurement system 70 is generally a simple yet powerful client/server system. Based on information that has been imported from the host MRP system, the procurement system 70 asks suppliers to commit to projected requirements. Requests are sent in the form of an electronic forecast that asks, "Can someone supply these parts, in these quantities, on these dates?" The procurement system 70 collects and analyzes all supplier responses relative to scheduled projections and flex ranges, reporting exceptions as necessary. Then, the procurement system 70 treats all supplier responses as commitments, whether a request can be met or not. In the event of an exception, buyers can use the procurement system 70 to adjust the commitment until the shortage is resolved.

The imported data is downloaded from the MRP system 130 into the supply input tables 111. The imported data can be further divided into three categories-reference data 111*a*, supply data 111*b*, and demand data 111*c*. The reference data 111*a* contain reference-related data and relationships used by the supply system 100 when building and organizing the system outputs. The supply data 111*b* contain supply-related data representing all sources of material supplies to an organization's manufacturing facility. The demand data 111*c* contain demand-related data representing sources of demand on an organization's manufacturing facility and, consequently, on the organization's supplies. Table 1 summarizes the data categories and corresponding system table that store the imported data:

TABLE 1

System Tables (Imported Data)

| Data Category | Table Name |
|---|---|
| Reference | ItemMaster [IM] |
| | Product Structure [PS] |
| | Shop Calendar [SC] |
| | Cost Elements by Cost Version [CE] |
| | Cost element Rate Code [CER] |
| | Inventory [INV] |
| | Representative Routings [RR] |
| | Work Centers [WC] |
| | Site Master [SM] |
| | Item Master Supply Site Source [IMSRO] |
| | Global Supply Site Source [SRO] |
| Supply | Purchase Order [PO] |
| | Work Orders [WO] |
| | Purchase Requisition [PR] |
| | Work Orders [WOX] (Config.) |
| | Gross Forecast [GROSSFO] |
| | Ship [SHP] |
| | Float [FLOAT] |
| | Audit [AUDIT] |
| | Intersite Supply Orders |
| Demand | Actual Requirements [AR] |
| | Actual Requirements [ARX] (Config.) |
| | Customer Orders [CO] |
| | Extra Usage Independent Demand [EU] |
| | Master Schedule Forecast [MS] |
| | Intersite Demand Orders [ISD] |

Returning to FIG. 1A, the database 110 may further include tables storing the user-defined data 112 as needed by the supply system 100. For instance, three user-defined tables are a Resource Optimization table (RESO), a Constraint-Based Master Planning table (CMP), and a Product Change Analysis table (PCA). Typically, the user creates the data that will fill these tables through control interfaces and options. Alternatively, the user may manually insert and edit records directly into the user-defined tables 112. The user-defined tables 112 may be used by supply system 100 when executing the resource optimization and product change analysis operations. It should be appreciated that imported data may be added to the user-defined tables 112 as well. For instance, the RESO table may also contain output data.

Continuing with FIG. 1A, the database 110 further contains tables storing output data 113. The output data 113 are created and presented to the user during operation of the supply system 100. Specifically, the output data contain the results produced by the supply system 100 and present the results in a way to be employed by the user. Some of these tables are named after the supply system 100 operations that create them: Supply Plan, Product Change Analysis, Resource Optimization, Resource Optimization with Constraint Based Master Planning, Resource Requirements Planning, and Compare. These operations are described in greater detail below. The following Table 2 lists some of the tables containing output data 113.

TABLE 2

System Tables (Output Data)

| Operation | Table Name |
| --- | --- |
| Supply Planning | Netting [NET] |
|  | Planning Periods [PER] |
| Compare | SP Compare [CR] |
| Supply Plan Action | SP Action [SPA] |
| Product Change Analysis | PCA Results [PCAR] |
|  | PCA Details [PCAD] |
|  | PCA Master [PCAM] |
| Resource Optimization | Resource Optimization [RESO] |
|  | Resource Optimization (w/OBMP) |
|  | RESO Details [RESOD] |
| Resource Requirements Planning | RRP Action [RRP] |
|  | RRP Planning Periods [RRPPER] |
|  | Rough Cut Details [RCD] |
| Numbers | Numbers [PMI] |
|  | Performance Details [RMID] |

The output data 113 may be presented to the user in the form of reports, which can be based on a complete table in the database 110 or a selection with that table. The reports can be generally viewed online, printed, or saved to a file for exporting to standard formats including Open Database Connectivity (ODBC) and dBASE.

The other tables are defined in Table 3:

TABLE 3

Supply System Tables

| Table Name | Purpose |
| --- | --- |
| Actual Requirements [AR] (imported input) | Identifies the shortage parts or dependent demands that go into work orders. Supply System will find or suggest supplies for these shortage parts. |
| Actual Requirements [ARX] (imported Configurator input) | Identifies the shortage parts or dependent demands that go into work orders. Supply system will find or suggest supplies for these shortage parts through the Configuration import feature. |
| Audit [AUDIT] (IMS) | View of the Gross Forecast, which is less than the number of customer orders plus the number of shipments. |
| Check Out [CHKOUT] (internal) | Records the copies made of Supply System databases stored on a server. |
| Cost Element Rate Code [CER] (imported input) | Stores the data required to perform rate-based cost roll-ups of the product structure. Rate codes can be used to add fixed-rate or percentage-based burdens to materials costs. |
| Cost Elements [CE] (imported input) | Stores one or more alternative parts' costing models or versions, which can be copied to and from the cost fields in the Item Master [IM] table. |
| Customer Order [CO] (imported input) | Stores the records of independent demand in the form of customer orders: what (parts), how much (quantity), and when needed (required date). |
| Extra Usage [EU] (imported input) | Stores the records of independent demands for items that are not typically end-times or products but that are required for maintenance or sparing purposes. |
| Float [FLOAT] (IMS) | Displays the quantity of unscheduled orders in the float table. |
| Global Supply Source [SRO] (imported input) | Defines the supply source for a site in multisite consolidation. I allows for global site definition and is most useful if one other site supplies most of the demands |
| Gross Forecast [GROSSFC] (IMS) | Contains information about forecast quantities in a monthly format. |
| Intersite Demand [ISD] (imported input) | Contains the transfer orders from all dependent sites. |
| Intersite Order [ISO] (imported input) | Contains supply transactions if commitments have already been made to fill a dependent site's demands. |
| Inventory [INV] (imported input) | Stores records of the onhand parts inventories associated with more than one site and/or stores within a site. You can copy or exclude selected individual sites/stores' on hand inventory to the ItemMaster [IM] table and, therefore, include or not for subsequent Supply Plan runs. |
| Item Level Supply Source [IMSRO] (imported input) | Defines the item level supply source for a site in a multisite consolidation. |
| ItemMaster [IM] (imported input) | Stores all the information Supply System needs about your parts (part numbers and descriptions), onhand inventory, order policies, and so on. |
| Master Schedule [IMS] (imported input) | Stores the records of independent demand forecast. |
| Netting [NET] * User Definable (input) | Stores the actions generated by a Supply Plan run as numerical pointers only. |
| PCA Detail [PCAD] (user input) | Stores the input details for all changes in product. It is also used to set up the pointers for the Change operation. |
| PCA Master [PCA] (user input) | Stores the master Product Change Analysis input parameters. The master input parameters point to specific Product Change Analysis Detail records. |
| PCA Result [PCAR] (output) | Holds the results of the Supply System Product Change Analysis. |
| Performance Details [PMID] (output) | Holds the results of a Supply System's automated planning performance measurement utility, called The Numbers. |
| Planning Periods [PER] (output) | Stores the data that define the structure of your planning periods, also known as buckets, and used by the Supply System. |
| Product Structure [PS] (imported input) | Holds the data that describes the relationships between parts that make up your products. |
| Purchase Order [PO] (imported input) | Stores records of parts supplies as purchase orders or scheduled receipts. |
| Purchase Requisitions [PR] (imported input) | Stores records of parts' supplies as purchase requisitions, if your planning needs to consider PRs to be scheduled receipts. |
| Representative Routing [RR] (imported input) | Stores the loading standards for each item and is used in the Resource Requirements Planning operation. |
| RESO [RESO] (output) | Holds both the input to, and the summary-level results of the Supply System's Resource Optimization details operation. |
| RESO Detail [RESOD] (output) | Holds the detailed results of a Resource Optimization run. |
| Rough Out Details [ROD] (output) | Stores the calculated load-detail results from the Resource Requirements Planning operation as numerical pointers only. |
| RRP Action [RRP] (output) | The RRP Action tables stores the RRP results; that is, the actions generated by an RRP run and translated into a readable form. |
| Ship Details [SHIP] | Contains information about shipment quantities in a daily format. |

Continuing with FIG. 1A, the user may create the supply data in the database 110 using a product attribute defining tool 120. The tool 120 generally assists the user in defining a commodity of interest, the current inventory levels of that commodity, and the various processes affecting the commodity's inventory level such as the acquiring, creating or use of the commodity. For instance, the user may employ a known MRP to define the commodity and relevant processes. Likewise, the user may use a known database programming language such Oracle SQL.

In one embodiment of the present invention, the product attribute defining tool 120 is a Product Attribute Language (PAL). PAL, as embodied in Networks Supply™ marketed by the owner of the present application, is a proprietary language used to model configurable assemblies. A flat file containing the substitution rule is compiled with a PAL compiler to produce the provisioning model of the configurable assembly. The key concept of the PAL model is the definition of consumer/provider relationships between the various parts. Parts are defined as consumer and/or providers of resources. Resource balancing ensures that the defined relationships are maintained. Resources can be thought of as tangible or intangible objects that are consumed or supplied by parts. PAL is used to specify the information a user may enter to choose product features, calculations needed to configure a product, and the bill of materials needed to build the product with the user-specified features.

PAL is a platform and product-independent fool for developing product attribute files and is described as follows: the PAL flat file is written with any text editor or word processor; is hardware independent; uses the standard ASCII character set, IEEE 64-bit floating point; can easily define user interfaces, allowing arbitrary degrees of simplicity or detail as appropriate to the user audience; supports simultaneous provisioning of related pieces of equipment; supports provisioning of extensions (add-ons to already installed products); and defines parts as consumers and/or providers of resources.

A PAL source file is divided into sections. Each section starts with a word that names the section and contains one type of information. The sections appear in a specific order. The source file includes a model section containing identification information describing the product attributes. The source file further includes tables that are used for looking up values that cannot be calculated; for obtaining values whose calculation is too complex or time-consuming; or for defining the dimensions and values for a table. Another component of the source file is a structure section listing the high-level pieces of equipment, typically products that are represented by the product attributes. Without the listing of structure information, then PAL assumes that all information in the variable and provision sections is part of the same structure. If the structure section contains any information, then the variable and provision information are assigned to specific structures. The variables section defines how relevant variables are to be presented to users, and how the variables are to be calculated. The execution section controls calculation of variables computed in various ways. The best way for the provision section to compute how many of each particular item needs to be configured is to use the resource-balancing features of PAL. To do this, the user creates a resource section that contains a list of resources that can be consumed and provided by provisioning entries. Since resources define relationships between configurable items, some resources can be identified as being the ones used to perform assignments, interconnections between pieces of equipment.

One set of product attributes can contain configuration information for several products. This section is used to specify the names of products and their relations with each other. It allows the product attributes to be separated into pieces, not at a syntax level like the various sections of a model split into semantically-related pieces, but rather into pieces that relate to a particular piece of high-level equipment.

Once a list of structures has been defined, entries in the variables and provision sections can be associated with one or more structures. Specifying structures allows the product attribute execution environment to present the information to a user in a more logical, product-oriented fashion and to run more quickly because it can ignore the parts of the PAL source file that are not part of a product the user is configuring.

Typically, an assembly is composed of a number of sub-components that are either parts or assemblies. The assembly may also consist of a combination of alternative parts or assemblies that provide the same functionality. PAL models can be used to represent the various possible combinations of an assembly. For example, if assembly A is initially composed of a part B and a part C, but can be also made from a part D and 2 units of part B. The following is another example of an alternative configuration where part C is originally composed of part A and part B. In an alternative configuration, C is constructed from the combination of parts D and B with the constraint that the quantity of part D is 30% of the original quantity of part A. If 100 units of C are required, an exploded demand of 100 units of A and B would be generated, wherein the exploded demand describes the constituting parts and resources needed to achieve a desired commodity. If 100 units of C are required, using the alternative configuration, an exploded demand of 30 units of D and 100 units of B would be required.

General PAL modeling constraints may include: (1) the configurable assembly provisioned in the PAL model should contain a product structure defined in a product structure table; (2) the substitutable parts should be listed in the IM table; (3) the substitutable parts are generally purchased parts; (4) if an assembly is defined as configurable part, the lead times for the primary sub-components must be greater than 0; (5) in order for a substitutable part to be in the configured assembly, the proper consumer/provider relationship must be established; and (6) the PAL model for a configurable assembly considers all the substitutable sub-components found in the original bill of materials (BOM) such that the sub-components in the BOM are used with the sub-components identified in the PAL model to help insure accurate quantities and/or parts found in the final assemblies.

The Bill of Materials (BOM) is listing of all the subassemblies, intermediate parts and raw materials that go into a parent assembly showing the quantity of each required to make an assembly. It is used in conjunction with a Master Production Schedule to determine the items for which purchase requisitions and production orders must be released. For instance an indented Bill of Materials report provides a multilevel view of the structure of products. This report exhibits the highest parent level parents closest to the left margin, and all the components going into these parents are shown indented toward the right. All subsequent levels of components are indented farther to the right. If a component is used in more than one parent within a given product structure, it appears more than once, under every subassembly in which it is used.

The PAL or another product attribute defining tool may be used by the user to define numerous special features of the supply data to be analyzed by the supply system 100. For instance, the user may define an order as being past due. An order may be treated differently when it is past due. If the Supply system 100 determines that an order is past due, the past due order may still be subject to rescheduling. Specifically, the past due order may be treated as if it were due today (start date). Alternatively, the supply system 100 may net the order without regard to the date.

Similarly, the user may also choose to exclude an order from the rescheduling logic. The user may also exclude some component parts from the supply system 100. There are many reasons why a user may choose to exclude any order or a component. For example, an order may be excluded if the supply system 100 cannot confirm the delivery of an order from vendor until a certain date, or if a production machine is down for maintenance.

Alternatively, the user or the supply system 100 may prevent the rescheduling of an order by making the order "firm." This action may also be referred to as "freezing" an order. When an order is firm, the order's quantity cannot increase or decrease, nor can the order be cancelled. When the user makes an order firm, the supply system 100 does not attempt to reschedule the order, nor does the supply system 100 reschedule any subsequent orders for the same part that are earlier than the firm order's due date. For example, if an order is rescheduled as a pull, it is pulled up only to the date of a firm order for the same part, if any. When there is unsatisfied demand for a part a planned supply order (PSO) is created, the recommended scheduling of the new orders starts with the due date of the last firm order for the part. Similarly, if an order is scheduled as a push, it is never out later than the date of a firm order for the same part. Alternatively, flexible firming also can be achieved by setting time fences for pushes, pulls, and cancels in the same dialog box.

The substitution feature within supply system 100 allows the user to schedule substitute components in assemblies on the occasions where there is insufficient availability of the primary component and insufficient lead-time to acquire it. There are three methods by which substitution logic may be applied: permissive, use-until-exhaust, and configurable. Permissive substitution permits an unavailable prime part to be replaced with a predefined alternative part(s), as well as a transfer part that is purchased at the source site, while respecting transfer lead-time. The substitution takes place following the supply planning phase. The user can set permissive substitution to partially fulfill demands. The Use-Until-Exhaust substitution permits an unavailable prime part to be replaced with a predefined alternative part after the supply of the prime part has been exhausted. In contrast with the permissive substitution, the use-until-exhaust substitution takes place during the supply planning phase, and the substitution part is used for all future requirements. The configurable substitution makes it possible for more sophisticated configuration rules to be used to determine what to do when a particular assembly must be ordered and there are alternative ways of building it. This type of substitution is generally implemented from within the supply system 100 as a phase after running the Supply planner 200 and before activating the Resource Optimizer 300, described below.

To determine if a substitution should take place inside a lead-time, the supply system 100 calculates the excess supply of both the prime part and the substitution part based on the assumption that all scheduled receipts outside a lead-time are pulled to the lead-time. The supply system 100 then verifies Available-To-Promise (ATP) inside a lead-time for a prime part if the supply sufficiently updates the prime parts of the demand and is fulfilled by the prime part, and if the supply is insufficient. Also the supply system 100 verifies that all demands inside lead-time are fulfilled before netting the demands at or outside lead-time.

To perform a substitution within lead time, the supply system 100 uses a predefined alternative part that has sufficient supply at the demand date for the prime parts. The demand is fulfilled by the substitution part by using a predefined alternative part that has sufficient supply quantities at the lead-time date. The demand is fulfilled by the substitution part, and the supply system 100 initiates a Planned Supply Order (PSO) for the prime part. Similarly, to determine if a substitution should take place at or outside lead-time, the supply system 100 checks whether the demand outside lead-time can be fulfilled with the prime part. If affirmative, the supply system 100 uses the prime part to fulfill the demand. If excess prime parts exist after the demand is fulfilled, the supply system 100 allocates these parts as possible substitution parts in other demands. If the prime part can not satisfy the demand, the supply system 100 performs a substitution. In performing a substitution at or outside lead time, the supply system 100 uses a predefined alternative part that has excess supply after all its own demands have been fulfilled. If substitution is not feasible, the supply system 100 plans a PSO for the prime part.

An analysis of supply and demand requirements should be performed to determine if a substitution is required. If a substitution is required, then an analysis of the predefined alternative part is also needed to determine its requirements. The substitution takes place only if the alternative part has excess supply over its own requirements. Alternatively, permissive substitution allows an unavailable transfer part to be replaced with a part(s) that is purchased at the source site, and the substitution of transfer does account for transfer lead-time. Generally, when the substitute part is a primary part and is at the same site as the primary part, there is no transfer lead-time, but when the substitute part is a primary part and is at a different site, there is transfer lead-time.

In another implementation, the supply system 100 allows the user to define phantom assemblies, which are parts that are normally consumed during the production process and are not normally stocked as separate entities. When the supply system 100 encounters a phantom part, the demand is passed through to the next level of components and no planned supply orders are created. Generally, phantoms only appear in the supply system 100 output if on-hand quantity exists or if there are any scheduled receipts. Phantoms are only planned if there is an independent demand dictated in a table such as Customer Order (CO), Master Schedule (MS), Extra Usage (EU), or Safety Stock (SAF). If phantom parts have a set safety stock, the supply system 100 recommends a safety stock replacement order only if available inventory, i.e., the quantity on-hand plus scheduled receipts before the supply system 100, is less than the full quantity of safety stock for the phantom part. Phantoms are used to logically flatten a bill of material (BOM). This is done when a manufacturer is running a work-order-less shop floor, and the supply system 100 is used to plan purchased parts only.

Optionally, the user may create an offset lead-time for a parent/component relationship. If the user enters a negative value for a parent/component relationship, the lead-time for that relationship is shortened from the lead-time for the parent part. The lead-time offset is used to delay the issuing of parts until the consumption point in the manufacturing process. This is useful for expensive components that are used later in the manufacturing process and/or when the manufacturing process is significantly long. However, by delaying the issue, the risk of being short a component and delaying the build increases. The supply system 100 takes lead-time offset into account when exploding dependent demand and planning due dates for orders. A safety/buffer lead-time can be used to adjust the lead-time of a purchased or manufactured part to accommodate events such as transportation between plant locations or raw goods testing. For example, if a vendor quotes a date, the part may be delivered on that date, but might not be available in the stockroom for three days. The user then enters a buffer value of three days to allow for this delay. The supply system 100 creates a planned supply order (PSO) for a part (purchased or manufactured) that has a safety buffer and subtracts that buffer lead-time from the original due date for the PSO.

In another embodiment, the user may define "shrinkage" of inventory. Shrinkage is usually expressed as a percentage of demand quantity of purchased parts. It is required because not all of the on-hand quantity of a part may actually be available due to such factors as limited shelf life, theft, or evaporation. To adjust for this possibility, the user or the supply program, specifies a shrinkage factor to indicate the percentage of loss that the user expects for this part. Then, when the supply system 100 performs its calculations to balance supply and demand, the demand quantity is inflated by the shrinkage factor. For example, if a shrinkage factor of 5 percent is specified for Part A, and an incoming demand quantity is 100, the supply system 100 increases the demand quantity to 105 before calculating net requirements.

Similarly, the user may define a "yield" quantity. Yield is a percentage factor used to adjust demand, but it is applied to the manufacturing of a part rather than the shelf quantity. While shrinkage applies to the part after it has been purchased, yield applies only as a function of the process of manufacturing the part. Therefore, yield affects the number of components used in fabrication. For example, when a work order is written for the finished quantity of a part, the finished quantity is equal to the number of components used in fabrication. Likewise, when a work order is written for the finished quantity of a part, the finished quantity is equal to the number of good parts available on completion of the order.

Continuing with the above example, in the manufacturing process for Part A, if it has an average yield of 75 percent, the user will need to have 105 parts available for inventory needs. The supply system 100 uses the yield factor (75 percent) to inflate the demand for all Part A components when the demand is exploded to lower levels. If the component parts are used equally in manufacturing a parent part, the yield factor specified for the parent part can be applied to adjust the demand for components. However, one component may not have to be scrapped or consumed as often as other components. Then, a yield override can be used to change the yield for that component.

Likewise, the user may define a scrap value to represent the wasted material produced during fabrication. Scrap is handled identically to yield: An increase in gross requirements is used to account for losses within the manufacturing of a specific product or component.

The user may use PAL to define engineering changes. When the supply system 100 processes an order to generate dependent demand for a part's associated components, it takes any pending engineering changes into account. For any product structure, there may be several engineering changes scheduled to take effect at different times within the planning horizon. When an engineering change is entered, the change is characterized as an end or stop effectivity on one (or many) parent/child part relationship(s) and a start effectivity on another, according to specific dates. The logic in the supply system 100 looks at the effectivity of engineering changes (EC) from two different perspectives. It can plan materials with effectivity at completion, which is based on the completion date of the parent part. In this case, the supply system 100 ignores all part structures with stop dates earlier than the parent part demand date, irrespective of the lead-time of the parent part. Alternatively, effectivity at the release date may be based on the completion date of the child part. In this case, the supply system 100 respects the lead-time of the parent part and honors existing child part allocations (WIP).

The supply system 100 further allows for overlapping effectivities—a period of time during which both components will be exploded by the logic. However, the supply system 100 generally requires explicit declaration of all start and stop dates. That is, the supply system 100 will not assume that a given component start date means that the replaced component stops.

The user may use the PAL to further define a type effectivity. There are occasions when a manufacturer wants to alternate between making an assembly or buying it from a vendor. This may be due to resource constraints, lead times, or economic reasons. The supply system 100 considers type effectivity to allow the user to schedule via date ranges that define the make or buy horizons.

In another implementation, the user may define an ABC classification for components. ABC classification allows the user to categorize inventory according to dollar value based on the part's actual gross requirements (AGR) as last calculated. The supply system 100 allows the user to recalculate the AGR with each run. Usually a small number of items account for the bulk of an organization's inventory value, while a large number of items account for a small inventory value. ABC codes allow the user to classify parts one of four ways. Type A items have high value and generally include the relatively few items whose value accounts for 75 to 80 percent of the inventory. These will usually be 15 to 20 percent of the items. Type B items have a medium value and typically include a large number of items whose value accounts for 15 percent of the inventory. Often, these will usually be 30 to 40 percent of the items. Type C items have a relatively low value and represent a bulk of the items whose value is almost negligible, accounting for only 5 to 10 percent of the inventory. The type C items will usually be 40 to 55 percent of the items. Then type D items may be all other components. The supply system 100 allows the user to modify these values to suit planning needs.

In operation, the supply system 100 multiplies the total standard cost by the actual gross requirements to arrive at the usage dollar value for each part. The usage dollar value is then compared against the total usage dollar value to determine its relative percentage and thus the ABC classification of the part. The supply system 100 allows the user to recalculate ABC code classifications of a part with each run. When planning orders, the supply system 100 uses the existing ABC code classifications, such as those calculated by the last supply plan run.

The ABC code logic follows these steps by multiplying the actual gross requirements (AGR) by the total standard cost for each part and adding the result to arrive at the cost of all parts for the year. The supply system 100 then reads the user-defined ABC Code Controls definitions for A, B, C, and D parts and breaks the total cost of all parts for the year down into the defined percentages. Further, the supply system 100 sorts the parts with their corresponding (AGR× Total Std Cost) values, from highest to lowest. The supply system 100 then allocates parts to group A until the percentage value for A parts is met and not exceeded. If an A part cannot be allocated group A (such as adding it would exceed the percentage value for A parts), the supply system 100 adds it to group B. The supply system 100 allocates parts to group B in the same manner, and repeats the allocation process for groups C and D.

The user may also establish order policies. In particular, the supply system 100 creates a PSO, the recommended quantities are based on the order policy governing the part and codes: Lot for Lot 1. Fixed Order Quantity
2. Period Order Quantity
3. Fixed Days
4. Days of Supply
5. Order Point
6. Gross Order
7. Maximum Batch Size Generally, the due date of a planned order is based on the date of the first unfulfilled demand. The Order Point policy, however, is an order launching method; therefore, the due date of the planned order is the date the projected availability goes below the order point, plus the lead-time for the part. Also, when entering or editing the planning and control information for a part in the item, the user can specify minimum and/or multiple order quantities which will be used by any of the order policies, with the exception of Gross Order. The supply system 100's planned order quantities will always be equal to or greater than the minimum order quantity for the part, if any. The user may also define a Maximum Order Quantity that forces planned order quantities to always be equal to or less than that value. Similarly, the planned order quantity for any part with a multiple order quantity will always be rounded up to the nearest multiple.

A Lot-for-Lot order policy is the most straightforward planning policy. Where the supply system 100 encounters an unsatisfied demand, it determines the net requirement for the part and recommends an order to satisfy the demand. The quantity recommended will be the same, lot-for-lot, as the unsatisfied demand, unless modified via the minimum, multiple, or maximum values.

The Fixed Order Quantity order policy is a straightforward policy that recommends an order (or orders) based on the fixed quantity specified for the part in the database. When the supply system 100 encounters an unsatisfied demand, it calculates net requirements and recommends as many orders in the fixed quantity lot size as are needed to satisfy the net requirements.

Where a part is governed by Period Order Quantity order policy, the supply system 100 recommends order quantities based on the first instance of an unsatisfied demand for the part plus the net requirements for the number of periods ahead as specified by the user. Optionally, only periods with non-zero demand are included. Therefore, if the user states five periods but there are periods of zero demand, the horizon will be enlarged until 5 periods of positive demand are encountered.

Where a part is governed by Fixed Days of Supply, the supply system 100 recommends order quantities based on the first instance of an unsatisfied demand for the part plus the net requirements for the number of days ahead as specified by the user. Generally, all days ahead are counted, including those with no demand (no orders). This is a difference from the Period Order Quantity order policy. Fixed Days is similar to the Days of Supply order policy except that it is specific to a part and is not associated with the part's ABC classification.

The Days-of-Supply order policy creates PSOs based on the ABC classification of each part. When the supply system 100 creates a PSO for a part using the Days-of-Supply Order policy, the quantity of the order is large enough to cover the next (n) days of demand where (n) is specified in the ABC Codes. In an order quantity multiple exists in the database for the part, then the recommended order quantity is rounded to the next highest multiple. Order multiples would be used, for instance, for parts that are always ordered by the dozen (multiple of 12).

The Order Point order policy is an order launching method unlike other order policies in that the supply system 100 recommends orders with due dates matching the date of the first unsatisfied demand (net requirement). The user may specify the inventory point or level at which an order should be placed. The supply system 100 will recommend an order when the projected availability of a part drops below its order point. The quantity of the recommended order will be in the IM table. The due date for the order will be the date on which availability is projected to drop below the order point plus the lead-time for the part. In theory, if the demand for a part is smooth, the projected availability will never drop below zero before the stock is replenished. If it does drop below zero, the supply system 100 recommends an order for the amount by which availability dropped below zero. The order point order policy is used where there are even demand requirements occurring smoothly from day-to-day or week-to-week. The order point value will be established by considering the lead-time for the part and typical demand during this lead-time. For example, if lead-time is a week and the demand is usually 50 units per week, the user might set the order point at 50 units plus a safety factor.

In contrast, a Gross Order order policy bypasses most of the normal Supply planning logic. The supply system 100 (on-hand stock and planned orders) is not balanced against demand and orders are not recommended to cover the gross requirements for the part. Instead, the supply system 100 passes the requirements through to the next level by creating demand entries for the part's components. This order policy is useful as a temporary step in converting from a gross requirements planning system to the supply system 100.

A Maximum Batch Size order policy is similar to the Fixed Days policy. However, whereas the Fixed Days policy calculates the period's requirements and places the total supply quantity on the first day of need, the Maximum Batch Size policy breaks up the supply quantity into predefined batches. The user defines 1) the number of days to look forward to determine total requirements for calculating supply quantity and 2) determines the batch size to be used to split the total requirements calculated over the order period. The functions of minimum, maximum, and multiple will also be considered in the logic for calculating an order in conjunction with the batch sized.

The user may also define a Unit of Measure conversion factor. The Unit of Measure (UM) is the unit in which the item is controlled for the purposes of the manufacturing process, for example, feet and inches. The UM information is reference information and is not a part of the supply system 100's calculations, as such. The supply system 100 uses the UM conversion factor to convert the units required for manufacturing into the units that the item is purchased or stored or into the quantity per assembly value. For example, tape and wire are materials that can be used in single inches by the manufacturing process but are purchased in hundred-foot rolls.

The user may also define a Quantity Per Assembly. The Quantity Per Assembly (QPA) is the quantity of a child part (component) required in the manufacturing of its parent. The supply system 100 uses it to calculate requirements during the netting process. The QPA values may be expressed as whole numbers or as decimals. The supply system 100 may round any such decimals after a decimal precision specified by the user.

In another embodiment, the supply system 100's Inventory (INV) table supports multiple inventory stores within each planning site. If the user uses multiple, separate inventory stores in the user's manufacturing environment, the user can carry and maintain the on-hand values from those stores. The INV table also supports specific safety stock factors for each item in each inventory store. This ensures that subsequent runs of the supply system 100 take the safety stock requirements for the part into consideration when planning orders.

Optionally, the supply system 100 may explode work orders. This feature enables the user to add new, unplanned supply work orders to a plan and then have the supply system 100 generate the associated supply requirements. Work orders (with their associated AR's) are essentially single-level bills of material with effectivity dates. They are either imported from a host MRP system or created manually within the supply system 100. Under normal circumstances, the supply system 100 logic uses work orders as supply, and where the demand for the part on the work order outstrips the supply, the supply system 100 generates PSOs for the part on the work order. Under normal circumstances then, the supply system 100 does not explode work orders to determine what parts go into them and what is short, but assumes instead that everything needed is already kitted. In some circumstances, inventory will be short a part (or the parts) required to kit a work order completely. Then, the supply system 100 checks for shorts on any work order and, if it finds any, will treat the shorts as demand and will find necessary inventory or recommend the appropriate supplies. In the course of a what-if analysis, however, the user may want to add a new, unplanned and unkitted WO to the plan to simulate the supply. The user may also want the supply system 100 to determine what parts will be needed to kit the new WO. In this case, the user will want the supply system 100 to consider all of the parts that go into the work order. The supply system 100 will then explode the work order and, during supply plan run, the supply system 100 will look to the Product Structure table and determine which parts go into the work order, post an AR for each part as a demand in the Supply Plan, and find INV or recommend PSO the necessary supplies. The AR's created in SPA table will have a required date that corresponds to either the start date of the work order, or to the work order start date offset by the production lead-time for the part. If during processing by the supply system 100, the new work order is pushed or pulled, the AR's associated with it will also be pushed or pulled, so that the AR required date agrees with the recalculated start date for the work order.

Furthermore, the supply system 100 allows the user to pull the required dates for selected parts by a specified factor, measured in days. This feature is called Safety Stock By Number of Days. It should be noted that the Safety Stock By Number of Days will not increase an order quantity but will simply pull the order in earlier than needed.

In a preferred embodiment the user may implement SmartBILL. SmartBill is an optional feature in the Supply application, and when the configurable substitution capability is enabled, or "added on," the supply system 100 gains the ability to dynamically configure its bill of materials (BOM). When the user selects configurable substitution, the supply system 100 submits a request to SmartCon (the program that does the actual configuration calculations in the SmartBILL product), which in turn configures substitute assemblies according to rules that have been specified by a product engineer in PAL. SmartCon then responds to Supply by providing a table of configured substitute assemblies.

By capturing the engineering configuration models and integrating them with the supply system 100, customer orders can actually generate a dynamic manufacturing bill instead of the standard BOM. The result is a SmartBILL, which is based on engineering specifications rather than predetermined part numbers. The advantage is that the SmartBILL retains the intelligence of the engineering model, taking into consideration the allowed alternates and resource dependencies. Advanced SmartBILLs can also contain additional constraints allowing substitutions to be optimized for cost and quality, as well as for on-time or expedited delivery. The result is faster order promising with less potential for material constraints to delay shipment.

The objective of configurable substitution is to always configure the exact amount of the target product that is requested by the supply system 100 and, while doing so, to choose the optimum time frame for delivery and the optimum quantities of the various alternative child products. The best among the competing child products are chosen based on an evaluation of the resources they provide, and the quantity of each that exists in inventory.

The process that the supply system 100 and the SmartCon configuration go through in their exchange of data is now described. First, the supply system 100 calls SmartCon and asks for each part that the user has flagged as configurable. The supply system 100 asks if there is a PAL model for it and, if there is a PAL model, what parts the SmartCon needs in order to build a configurable part. SmartCon finds and loads the product attributes file whose name corresponds to the requested product. SmartCon also finds each product in the model and calculates how many of each resource that product consumes (if it is a negative quantity) or provides (if it is positive). The sum total of these resource quantities for all of these structures represents the amount of resources required when one target product is configured. SmartCon updates the target product in the loaded model with the required quantity (obtained by the supply system 100) and a list of resources that are the inverse of those calculated in above. This list represents the resources consumed (or provided) when a quantity of one of the target product is configured. The variables section of the model is computed. Variables are only used when certain repetitive or complex calculations might be required that are then used in the calculation of the configured items. SmartCon does a run to calculate configured results for each time period found in the inventory records.

It is known that in each case the final results will include the quantity of the target product that was requested by the supply system 100. However, the child products will also be configured using the rules of resource balancing to balance the consumers and providers of each resource type. The quantity of child products that results will depend on what resources each provides (and/or consumes) and the amount that is available in the existing inventory (allocating from existing inventory being preferred over configuring more of a particular product). The best result from the various configurations (one for each time period) is chosen based on which configuration represents the lowest cost (using the input cost data). SmartCon packages up the results and responds, supplying the order with the specified parts in the returned configuration to the supply system 100.

Figure 1D:
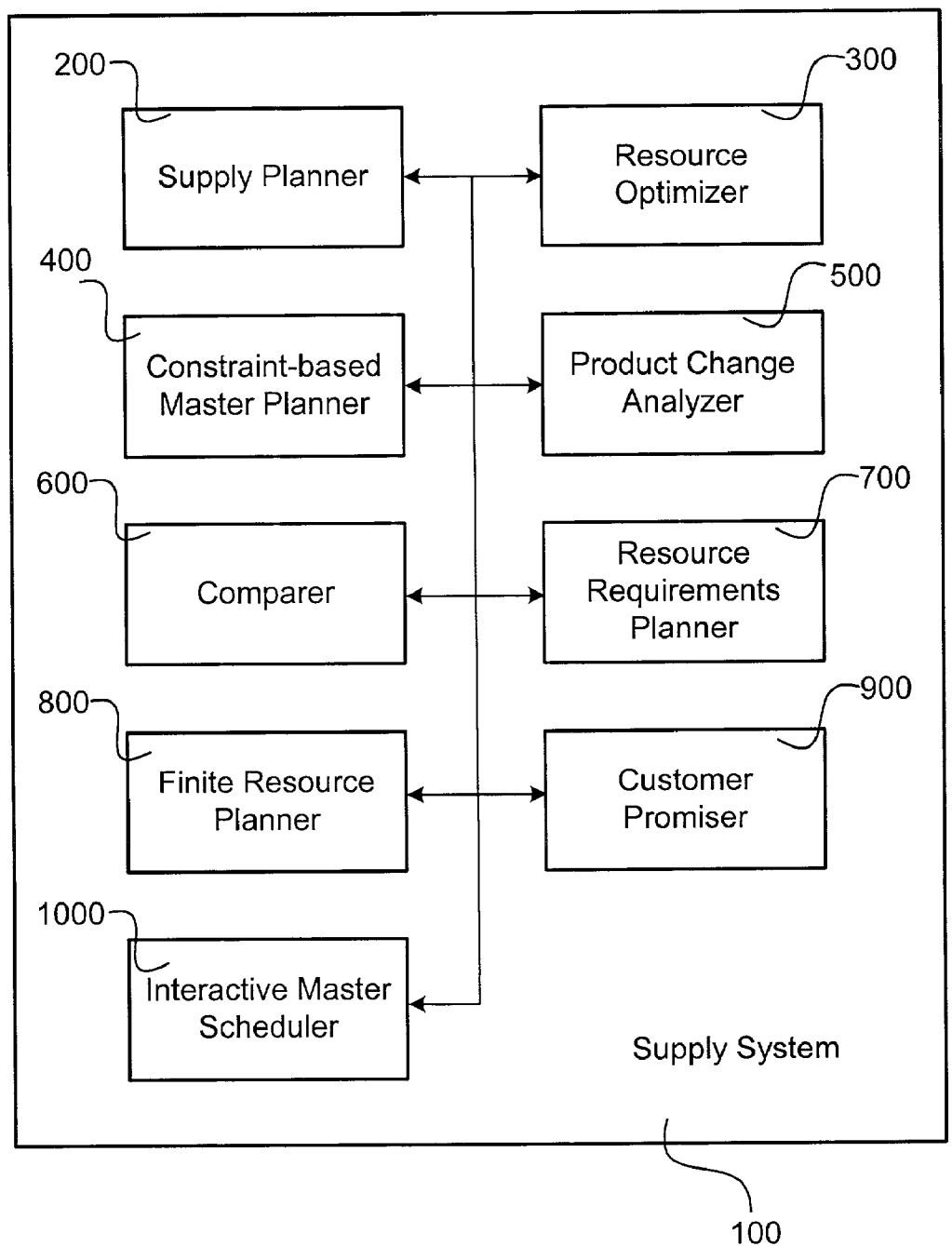

Turning now to FIG. 1D, the supply system 100 includes various components to assist the user to examine many aspects of business. As depicted in FIG. 1D, the supply system 100 may include various combination of components including a Supply Planner 200, a Resource Optimizer 300, a Constraint Based Master Planner 400, a Product Change Analyzer 500, a Comparer 600, a Resource Requirements Planner 700, a Finite Resource Planner 800, a Customer Promiser 900, and an Interactive Master Scheduler 1000. The operation of each of these components is described in greater detail below.

Supply Planner 200

As depicted in FIG. 1D, the supply system 100 includes a supply planner 200. The supply planner 200 is the functional heart of supply system 100. The output from the supply planner 200 is the basis for other analytical functions and will be used by other supply system 100 applications to generate their respective results. The supply planner 200 functions to produce supply allocation plans used for meeting the demand for the user's products. As depicted in a supply planning method 201 of FIG. 2, the supply planner 200 first try to meet demand for a SKU by using existing inventory. If the current inventory is insufficient, then supply planner 200 turns to the make, sourcing, and purchase processes that specify the requirements for producing, transporting, or buying the SKU as needed for the demand. The supply planner 200 generally tries to meet the demand using the highest-priority process first. When the supply planner 200 finds a process that can meet some or all of a demand order, the supply planner creates a supply order to implement a make, a sourcing, or a purchase process. The supply planner 200 continues until the demand is met or until there are no more processes for that SKU. The supply planner 200 looks at material availability and production capacity simultaneously, resulting in feasible plans based on the constraints that exist in a company, step 210. The user can set other constraints based on her business strategy, such as rules for calculating safety stock and consuming forecasts with customer orders, step 220. In producing supply plans, the supply planner 200 may implement Materials Requirements Planning (MRP) using standard American Production and Inventory Control Society (APICS) MRP logic. Alternatively, the user may designate any other logic to follow during resource allocation using supply, as in step 220.

While creating supply plans, the supply planner optimally respects constraints specified by the user or predefined in the supply system 100, such as material availability and production capacity. The supply planner may also use rules that user sets for procedures such as forecast adjustment and safety stock calculation. Specifically, the supply planner 200 optimally allows the user to specify a priority scheme so that the orders that are most important to a company are met first. For example, the user may assign a high priority to large-volume customers to ensure that their demand is satisfied. The user can also specify item and location priorities for forecast orders (i.e., actions taken in anticipation of expected future orders) and safety stock orders (i.e., action to maintain desired minimum inventor levels). The orders suggested by the supply planner 200 may then be exported to another system, step 250, using methods analogous to those described in the text accompanying FIG. 1C regarding the importation of the data from other system to the supply system 100.

Figure 2:
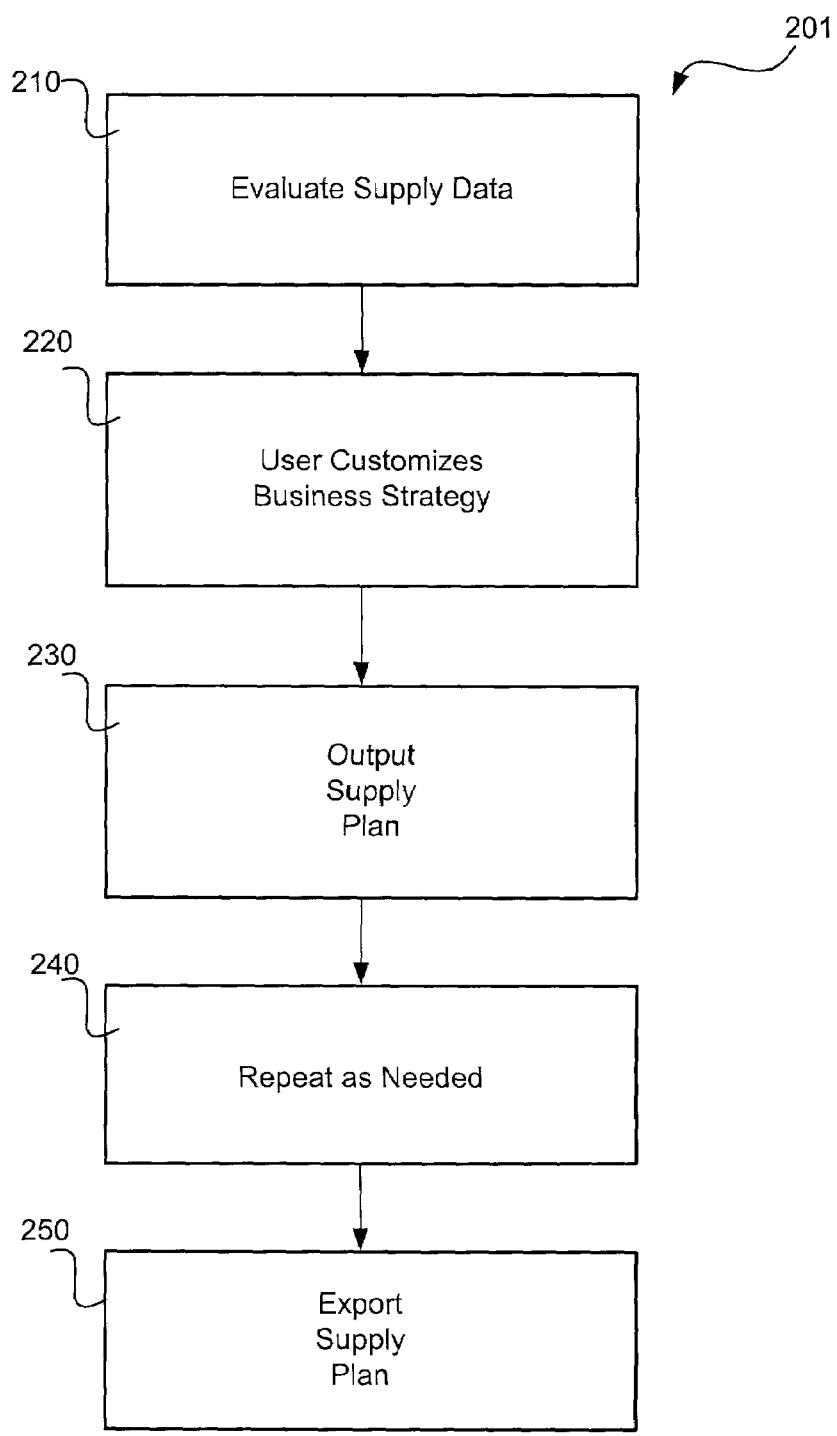
FIGS. 2–9 illustrate flow charts depicting the steps in the operation of various components of the supply allocation system of FIGS. 1A–1D in accordance with embodiments of the present invention.

Continuing with FIG. 2, after setting up the database 110, the user may generate a supply plan on a periodic regular cycle step 240, e.g., twice a month or every week. The user may generate a supply planner 200 either in batch mode or interactively. The user may first generate plans for all SKUs in batch and then work interactively with a small set of SKUs that have exceptions.

Continuing with FIG. 2, the supply planner 200 many produce one or more output tables summarizing the findings of the supply planner 200, step 230, and this output table may be stored in the database 110. The supply planner 200 may also produce a report summarizing the suggested orders to effect the desired supply changes. The following reports are specific to the supply planner 200: Summary report, Sheet report, Purchase Order Action report, Work Order Action report, Excess Inventory report, Supply planner 200 Shortage report, Transfer Order Action report, and Critical Material Shortage report.

Generally, the supply planner 200 attempts to balance existing inventory supply and customer demand. When the supply and demand do not balance, the supply planner 200 recommends the rescheduling or canceling of work orders, purchase orders, and intersite orders. The supply planner 200 may also create new planned supply orders/intersite orders. Among the operation that the supply planner 200 can recommend are:

Blank: A record that has not been rescheduled or restricted in any way so no action is required;
New: A record that has been generated to balance the supplies and demands;
Push: A supply rescheduled to a date later than its original date;
Pull: A supply rescheduled to a date earlier than its original date;
Cancelled: A supply canceled as a result of insufficient demand;
(Push): A supply that recommends to reschedule to a later date, but which is filtered by the Supply planner 200 settings to remain unchanged from its original date;
(Pull) A supply that recommends rescheduling to an earlier date, but which is filtered by the supply planner 200 settings to remain unchanged from its original date; and
Firm A supply that has been set as "Firm" in the supply tables (described below) and is thus unchanged regardless of supply/demand needs.

The production of the output table in step 230 is now described in greater detail. The output tables assist to allow the user to interpret the substitutions recommended in the supply plan. The step 230 may include the creation of a Supply Planner 200 Action (SPA) table. The SPA table displays predefined alternative supply and demand. A substitution is planned for a predefined alternative part when the supply of a prime part is insufficient to fulfill a demand. The supply can be on-hand inventory, purchase and work orders, or purchase requisitions. There may be two Supply Planner 200 (SP) types in the SPA table: SPS, a part with a predefined alternative supply; and SPD, a part with an alternative demand placed on it.

The supply planner may apply filters used when creating the SPA table. For instance, the SPA table may specify certain types of actions or actions related to certain types of items. The filters only modify the results data are copied to the SPA but do not affect the supply planner 200 itself. Likewise, the filters will not effect the operation of the other supply system components, such as Resource Optimization, Product Change Analysis, or Compare operations, all of which use Netting table data as input and not the filtered contents of the SPA table. The supply planner 200 may further apply these filters from the SPA table to supply planner 200 reports.

A supply plan summary report formed in step 230 provides a summary of data from the SPA table. The supply planner 200 summary report provides a clear picture of the user's operation in a concise report. For each of the categories selected in the report options dialog box, the purchased, assembled, and transferred part investments are indicated periodically (such as monthly). This supply plan summary report provides the information to assess the levels of inventory at the beginning and the end of the period, as well as the amount of money tied up in inventory.

Similarly, a supply plan work order action report shows all of the work orders (WO) planned by the Supply planner 200 run selected. The WO action report is specifically designed for planners. By using the report output, planners can see how the present schedule must be adjusted to meet demand requirements on assembled parts. The various report options allow planners to target specific information. By looking at all new actions (or planned supply orders or PSOs), planners can see if it is possible to fulfill the new work orders. If the PSOs are excluded, a clear view of existing work orders is displayed. By looking at the actions (such as push, pull, or cancel) on the existing work orders, the planner can reschedule the shop work as required and attempt to identify the planner can reschedule the shop work as required and attempt to identify where these actions can not be met.

A supply plan purchase order (PO) action report shows all of the purchase orders or planned supply orders (PSO) suggested by the supply plan run. The supply plan PO action report is essentially a buyer's tool. The user can restrict the supply plan PO action to a specific buyer or get a more global view of the situation by including all buyers. When looking at the supply plan PO action with PSOs included, a buyer will see what orders should be considered to meet demand requirements. If PSOs are excluded from the supply plan PO action, a clean view of purchase orders only will be presented. From this supply plan PO action (with the excluded PSOs), buyers can review the purchase orders that have been placed against the actions (such as push, pull, or cancel) recommended by the supply planner 200. If the action is achievable, the buyer can then attempt to put the action into effect.

Similarly, a supply plan excess inventory report shows the entire ending available inventory from the specified supply plan action table. The excess inventory report can provide valuable insight into an organization's inventory position. The first date that the user may want to review in the excess inventory report is the excess inventory with no PSOs. If the excess position is reviewed over a sufficient horizon, the user will see what items are being held that have a low possibility of being used. Perhaps this inventory is required as replacements for older models of a product; perhaps this stock can be removed. Another approach to the user's review of the excess inventory report can be to include the PSOs. By looking at this report over a sufficient horizon, the user can see the inventory that will be in excess at the end of a specified period, and the inventory listed will include forecast for the next period. In turn, the user may employ this information in making an assessment on ordering policies.

Another report, a supply plan shortage report shows the part shortages in a supply planner 200 represented in a SPA table. The supply plan shortage report provides a snapshot of an organization's shortages for an assessment of material and production control schedules. Whether multi- or single-site, the data can be analyzed for a single part, or all parts or for a select set of planners or buyers. An ABC part filter described above, is an element to the shortage report, as it allows the user to verify the feasibility of a part classification and to address issues such as whether a shortage of class A parts is one time or consistent event or whether the insufficient lead-time for class A parts is best addressed by reducing the lead-time for class A parts or accounting for an increased lead-time. With this information, the user can attempt to reduce shortages as the user processes various simulations.

Another type of report is a transfer order action report. The transfer order action report shows all of the intersite orders created by a supply plan. The transfer order action report is quite similar to the PO action and WO action reports but is used for multisites, where one planner might be responsible for planning between sites. The report has the flexibility to show intersite orders with actions only, such as push, pull, or cancel, to assist the planner in making adjustments to the planning schedule. The report does, however, allow for a full printout of intersite orders if required.

Similarly, the supply plan critical material shortage report, provides a method for rapidly pinpointing parts for which there might be a shortage. Specifically, the supply system 100 reports on those parts that experience a shortage before a certain date. It is especially helpful when the user has drop-ins (i.e., unexpected changes) and needs to see if the drops will cause shortages. Drop-ins include the following: pure drop-ins in which new parts added; changing the current due dates, or pulling-in demand, of an existing part; and increasing current scheduled quantities of an existing part.

The user may also form a netting table. In particular, a Master Production Schedule (MPS) performs analysis of multiple levels in the Bill of Materials (BOM). This analysis allows visibility of Available-to-Promise (ATP) at each level, and ensures all supply and demand is presented for each item. The MSP function provides available-to-promise and projected available data by single period, as well as for cumulative periods, at the independent demand level. The MPS also includes dependent demand items at the user's request. This feature allows users to perform an MPS analysis at multiple levels on a BOM. The MPS will then show the user the available-to-promise items at multiple levels, allowing the user to see supply and demand for each MPS item. The MPS performs its calculations based on an existing netting table. The existing netting table can be the default netting table created by the supply planner 200 or a netting table that the user has created and named independently. The netting table compares the forecast and customer orders against the supply picture to confirm the supply/demand balance. This review is meant to be conducted at the independent demand level before going through exploded work orders and detailed part planning. This table provides available-to-promise information by period, and a cumulative available-to-promise calculation. Available-to-promise is the uncommitted portion of a company's inventory and planned production, maintained in the master schedule to support customer order promising. The available-to-promise quantity is the uncommitted inventory balance and any supply orders in the first period and is normally calculated for each period in which an MPS receipt is scheduled. In the first period, available-to-promise includes on-hand inventory plus any supply orders, less customer orders that are due and overdue, until the next period of supply. In subsequent periods, available-to-promise shows the uncommitted remainder of supply orders until the next period of supply.

As described above, the supply system 100 generally employs stand APICS logic in planning resource allocation. The user may also specify supply allocation priorities for use with the supply system 100, step 220. In one embodiment, the supply system 100 has three primary logic options for determining supply allocation priorities: Earliest Available Supplies, Best Fit Supply Allocation and Hard Supply Allocation. By default, the supply system 100 generally uses the Earliest Available Supplies logic, in which independent demands are prioritized according to demand type. Independent demands of the same type are then further prioritized by due date. The supply system 100 then allocates all the necessary material to the demand with the highest priority before satisfying the demand with the next highest priority, and so on. When satisfying a demand, the supply system 100 allocates scheduled receipts in the following order: Inventory, Work Orders (WO), Purchase Orders (PO), Purchase Requisitions (PR), and Planned Supply Orders (PSO). Once a supply quantity of a given part has been allocated to a demand, that quantity is no longer available for allocation to any other demand. Quantities are located to demands on a first-required, first-filled basis. All supply planner 200 orders (new orders, reschedules, and cancellations) are respected. This method is not appropriate, however, for all situations. For instance, when going with Earliest Available Supplies logic, inventory is exhausted to satisfy a demand even if there is time to build or order the part in question. This leaves inventory depleted and unable to satisfy any other demands of a lower priority that have an earlier due date. These other demands might, therefore, be late. If the inventory had been applied to them instead, they might have been available on time. The other two methods of satisfying demands (Best Fit Supply Allocation and Hard Supply Allocation) address this shortcoming as described below.

To addresses the above-described problems, the user may choose to apply Best Fit Supply Allocation logic. In contrast with the Earliest Available Supplies logic, the Best Fit Supply Allocation logic will allocate the latest or last-possible available supply that will still allow the demand to be met on time. The Best Fit Supply Allocation logic treats demands differently. Depending on whether the demand is within or not within the cumulative lead-time, the RESO 300 will allocate a scheduled receipt (the latest one) and only allocates a planned order as a last resort if no scheduled receipt exists to satisfy the demand. On the other hand, if the demand is not within the lead-time, the supply system 100 will allocate the latest or last-possible supply that will satisfy the demand, regardless of whether it is a scheduled receipt (inventory included), or a planned order. The supply system 100 generally treats purchased parts differently from assembled and transferred parts. For purchased parts, the purchase lead-time is used; whereas, with transferred and assembled parts the cumulative lead-time is used. Furthermore, the supply system 100 may treat purchased parts differently from assembled and transferred parts. For purchased parts, the supply system 100 may use the purchase lead-time, whereas, the cumulative lead-time is used with transferred and assembled parts. The supply system 100 may also treat purchased parts differently from assembled and transferred parts. In one implementation, only the purchase lead-time are used to assess the availability of purchased parts. However, a preferred embodiment of the supply system 100 further considers scheduled receipts for purchased parts that are outside of the stated lead-time plan.

Additionally, the supply system 100 may arrange planned orders for PSOs for either the need date or the lead time, whichever is greater. This lead-time calculation is in contrast to transferred and assembled parts that only use the cumulative lead-time. Thus, Best Fit Supply Allocation logic, unlike the Earliest Available Supplies method, will not allow inventory to be depleted, leaving the inventory to be optimally applied to those demands that need it. Likewise, any other scheduled receipts will not be consumed if there is one of a lower priority that can satisfy the demand.

Alternatively, the supply system 100 may use the Hard Supply Allocation logic that prioritizes demand by type. As described above, the conventional Earliest Available Supplies method prioritizes independent demands by demand type and then further prioritizes independent demands by demand type and then further prioritizes independent demands of the same type by due date. By contrast, the Hard Supply Allocation method prioritizes by type only, treating all demands of the same type as being equal. Within a type, the supply system 100 allocates component parts to the demands that require them first, regardless of the due date of the top-level product. In other words, the supply system 100 takes into account the cumulative lead-times and allocates supplies so those products with long lead-times get the parts they need on time. In contrast to the Earliest Available Supplies method that may deplete inventory to satisfy the demand with the earliest due date, the Hard Supply Allocation logic will allocate inventory to those demands whose products have a cumulative lead-time so long as they can not be satisfied by other scheduled receipts or planned orders. Demands that can be satisfied by supplies other than inventory are satisfied by scheduled receipts of a lower priority, or by planned orders. Thus, the Hard Supply Allocation logic may increase the chances that all demands can be met on time.

Mathematical Model for Supply Planner

In one implementation, the supply planner 200 operates using the following mathematical model. In this mathematical model, Planning Decision Variables include:

$X_{it}$=Fraction of demand i shipped in time period t.

$Y_{kt}$=Fraction of work order k built in time period t.

$I_{jt}$=inventory of item j at end of time period t.

$P_{jt}$=production of item j in time period t (i.e., new work order for assembled item, new purchase order for purchased item)

$W_{jkt}$=withdrawal of item j to build work order k in time period t.

$U_{jkt}$=free usage of item j (i.e., usage of issued inventory) to build work order k in time period t.

In addition, some Independent Demands are defined in the mathematical model using the following variables:

$d_{ij}$=quantity of item j required by demand i.

$a_i$=revenue associated with demand i.

$\beta_i$=margin associated with demand i.

M=number of independent demands.

For a given demand I, $d_{ij}$ will be nonzero for only one item j. If it is desired to treat a set of independent demands as a single group, then create an artificial parent item and make the set of independent demands children of this artificial item.

Similarly, Dependent Demands are defined in the mathematical model using these variables:

$q_{ij}$=quantity of item j required per assembly item i.

$S_j$=set of assembled items requiring item j.

The quantity per assembly $q_{ij}$ should already reflect mix, shrinkage and yield adjustments.

Scheduled Work Orders are represented by the following variables:

$S_{jk}$=quantity of item j supplied by work order k.
$a_{jk}$=actual requirements of item j for work order k.
$t_{jk}$=quantity of item j already issued (or "kitted") for work order k.
$LT_k$=lead-time for work order k.
W=number of work orders.
$A_j$=set of work orders with actual requirements for item j.

Note that, for a given work order k, $S_{jk}$ may be nonzero for more than one item j. This is equivalent to saying that a work order may supply more than one item.

Furthermore, Purchase Order and Purchase Requisitions are: defined using the following variables:

$r_{jmt}$=quantity of item j supplied by purchase order/requisition m in time period t.
P=number of purchase orders and purchase requisitions.
$P_j$=set of purchase orders and purchase requisitions for item j.

Other Item Constants are:

$LT_j$=fixed or average assembly lead-time for assembled item j.
$c_j$=standard cost of item j.
N=number of constrained items.

Note that $LT_j$ is the fixed or average lead-time for assembled item j. If an item's lead-time is variable, the average lead-time is calculated as the variable lead-time component multiplied by the standard lot size, plus the fixed lead-time component. Also note that $LT_k$ is the lead-time for work order k and $LT_j$ as the fixed or average assembly lead-time for assembled item j. If it is not important to allow scheduled work orders to have lead-times different from new work orders, then $LT_k$ may be replaced with the lead-time $LT_j$ for the most important item j supplied by work order k.

The various facilities (Work Centers) are defined using these variables:

$b_{nt}$=capacity of work center n in time period t.
$g_{jn}$=variable time required to process item j at work center n.
$h_{jn}$=fixed time required to process item j at work center n.
C=total number of work centers.

The capacity $b_{nt}$ may be adjusted by a load factor, to express the net capacity of work center n, less maintenance and repair downtown, etc.

A last constant is:

T=number of time periods.

Constraints defined using the above-introduced variables will now be described. Equation 1 represents Inventory Balance and is generally the primary material constraint. It keeps track of the inventory additions and withdrawals, and ensure that the inventory of each item does not become negative in any time period. The first four terms on the right side represent the inventory supplies: inventory from the previous period, new supply (i.e., new purchase orders, new work orders) in this time period, scheduled work order quantities built in this time period, and scheduled purchase orders and purchase requisitions arriving in this time period. The last three summations represent the inventory withdrawals: demands shipped in this time period, withdrawals due to assembly of new work orders in later time periods, and withdrawals due to assembly of scheduled work orders in later time periods.

$$I_{jt} = I_{j,t-1} + p_{jt} + \sum_{k=1}^{W} s_{jk}y_{kt} + \sum_{m=1}^{P} r_{jmt} - \sum_{i=1}^{M} d_{ij}x_{it} - \sum_{i \in S_j} q_{ij}p_{i(t+LT_i)} - \sum_{k \in A_j} w_{jk(t+LT_k)} \forall j = 1, K, N; \quad \text{(Eq. 1)}$$

$$t = 1, K, T.$$

In time period 1, the first term on the right side ($I_{j,t-1}$) is set to the initial on-hand inventory.

Note that the $y_{kt}$ variables allow the Supply planner 200 to push, pull, cancel, or split work orders. Because the purchase orders and purchase requisitions do not have a corresponding set of variables, users cannot alter these scheduled receipts. For scheduling to take actions on purchase orders and purchase requisitions, then an additional set of variables for these scheduled receipts are created.

Independent Demand Constraints, represented in Equation 2, ensure that the quantity of each independent demand shipped (or completed or built) is at most the quantity demanded. Note that since the constraints are inequalities, rather than equalities, they permit the possibility that some independent demands are not completed.

$$\sum_{t=1}^{T} x_{it} \leq 1 \forall i = 1, K, M. \quad \text{(Eq. 2)}$$

In Equation 2, the time period t indicates the period in which the demand is shipped.

As they are stated above, these constraints (Equations 1 and 2) take the summation across the entire planning horizon and thus allow the possibility that demands be completed at any time during the planning horizon. To restrict the periods in which a given demand I can be completed, the summation should be restricted to a particular window during the planning horizon; i.e., the summation should begin at some time period greater than 1 and end at some time period less than T. This window can depend on the need date for the demand. For example, suppose a demand is due in period 14. To ship demands up to 3 periods early and 4 periods late, then the summation should go from t=14−3=11 to t=14+4=18.

The structure of the independent demand constraints assumes that most independent demands must be shipped complete, but the constraints accommodate both demands that must be shipped complete and demands permitting partial shipments. For demands I which must be shipped complete (i.e., in one shipment), $x_{it}$ should be constrained at a binary variable for all time periods:

$$x_{it} \in \{0,1\} \forall t=1, K, T. \quad \text{(Eq. 3)}$$

For demands I permitting partial shipments, $X_{it}$ should not be constrained as a binary, but in Supply planner 200, all $X_{it}$ variables are generally constrained to be binary.

Another type of constraint, Scheduled Work Order Constraints ensure that the user builds at most, the specified quantity of each work order. Note that since these constraints are inequalities so that they permit the possibility that the user builds less than the specified quantity.

$$\sum_{t=1}^{T} y_{kt} \leq 1 \forall i = 1, K, W. \quad \text{(Eq. 4)}$$

In equation 4, the time period t now gives the time period in which the work order quantity is complete.

The Scheduled Work Order Constraints are similar to the independent demand constraints and thus allow similar flexibility. To restrict the periods in which a work order can be built, the summation should be restricted to a particular window, probably depending on the original scheduled completion date for the work order. For work orders k that cannot be split, $y_{kt}$ should be constrained as a binary variable for all time periods:

$$y_{kt} \in \{0,1,\} \forall t=1, K, T. \quad \text{(Eq. 5)}$$

For work orders k that can be split, $y_{kt}$ should not be constrained as a binary variable.

Another type of constraint, Actual Requirements Balance and Withdrawal and Free Usage Limits, together ensure that the correct quantities of actual requirements for work orders are withdrawn from inventory. The actual requirements balance is stated as follows:

$$u_{jkt} + w_{jkt} = a_{jk} y_{kt} \forall j=1, K, N; k=1, K, W; t=1, K, T. \quad \text{(Eq. 6)}$$

The withdrawal and free usage limit constraints look like this:

$$\sum_{t=1}^{T} w_{jkt} \leq a_{jk} y_{kt} \forall j = 1, K, N; k = 1, K, W, \text{ and} \quad \text{(Eqs. 7 and 8)}$$

$$\sum_{t=1}^{T} u_{jkt} \leq t_{jk} \forall j = 1, K, N; k = 1, K, W.$$

The actual requirements balance constraints state that the free usage and withdrawals of item j for work order k in time period t must equal the fraction of the total actual requirements for work order k actually built in time period t. The withdrawal limit constraints guarantee that the total withdrawals do not exceed the quantity of item j left to pull for work order k, and the free usage limit constraints ensure that the total free usage does not exceed the quantity of item j already issued for work order k.

The decision variables pjt give the quantity of time j that is produced in time period t. If item j is a purchased item, the $p_{jt}$ corresponds to a new purchase order; if item j is an assembled item, then $p_{jt}$ corresponds to a new work order. The only difference, from a modeling perspective, between purchased items and assembled items is that the production variables pjt associated with an assembled item j appear in the inventory balance constraints of the child items, at the time these child items must be withdrawn from inventory. For each item j, to ensure that new supply does not arrive before the lead-time has elapsed, the decision variables $p_{jt}$ should not exist for time periods where t is less than the lead time. For example, suppose a purchased item has a lead-time of 20 days. Then $p_{jt}$ should not exist for time periods t=1, K, 19. (Another way of enforcing periods, but fix their values at zero.) For assembled items, the relevant lead-time is the assembly lead time, not the cumulative lead time.

Manufacturing an assembled item j typically requires the completion of a series of operations in a particular sequence. In order to allow the necessary flexibility to begin manufacturing an item well before it must be complete, Users may create artificial items for each operation in the routing except the last one. Consider an item A with four routing operations. For routing operations 1 through 3, create three artificial items, call them A1, A2, and A3. The children of the original item A become children of A1; A1 is the only child of A2; A2 is the only child of A3; and A3 is the only child of A. The last routing operation corresponds to original item A. In this way, parents of item A will continue to point to item A as their child, and production of these parents will result in withdrawals from the inventory of completed item A's.

Work orders for the original item A must become work orders for item A1, the artificial item corresponding to the first routing step. Building a work order for A1 will result in withdrawals from the work order's actual requirements, if given, or from A1's children, if the work order must be exploded. The supply of A1 created by the work order is then available for withdrawal by production of A2, the next artificial item in the routing.

The user must determine assembly lead times for each artificial item. If the original item's assembly lead-time is variable, this calculation is simple: the user uses the variable times for each routing operation multiplied by the standard lot size, plus the fixed lead-time for each routing operation, and round this quantity up to the nearest integer. If the original item's lead-time is fixed, the user distributes it over the artificial items so that (1) their individual assembly lead-times reflect the fraction of the total assembly time required by each routing operation, and (2) the sum of the individual assembly lead-times approximates the original assembly lead-time. These two objectives sometimes conflict, especially when the original assembly lead-time is short.

The following algorithm gives one possible method for calculating lead-times for the artificial items:
1. If item j's assembly lead-time is fixed, determine a standard lot size as follows: standard lot size=($LT_j$−sum of fixed lead-times for all routing operations)/(sum of variable lead-times for all routing operations) Otherwise, use the standard lot size given in the Item Master table.
2. For each routing operation, multiply the routing operation's variable time by the standard lot size and add the fixed lead-time. Round this quantity up to the nearest day. This is the assembly lead-time for each artificial item and, for the last routing operation, the revised assembly lead-time for the original item.
3. (Optional) Apply an adjustment so that the sum of the artificial item's lead-times is a reasonable match for the original assembly lead-time.

Step 3 might be necessary if the rounding in step 2 adds too much time. For example, if a routing has four operations of equal duration, then each of the three artificial items will be assigned a lead-time of at least one day, and the original item will be assigned a revised lead-time of at least one day. The resulting overall lead-time is four days. But if the original assembly lead-time was only one day to the first artificial item, and a lead-time of zero to the others.

The following pseudocode algorithm summarizes the creation of artificial items for every item with a multi-step routing:
1. Create an artificial item for every routing operation except the last one.
2. Copy the original item's children to the child array of the artificial item for the first routing operation.

3. Replace the original item's children with a single child pointing to the artificial item for the second-last routing step.
4. Proceed backwards through the routing, making the artificial item for routing operation n a child of the artificial item for routing operation n+1.
5. Move the original item's work order information, including actual requirements, to the artificial item for the first routing operation.
6. Use the algorithm given above to calculate the assembly lead-times for the artificial items and a revised lead-time for the original item.

With the creation of these artificial items, the user builds the inventory balance constraints in the usual manner. Now the only question is how to construct the capacity constraints. To answer this question, supply accounts for each routing operation's fixed time. The user can either introduce another set of decision variables to account (almost) exactly for fixed assembly time, or can approximate the percentage of time each work center spends in set-up mode (or other modes that consume fixed times per production batch).

If the user introduces another set of decision variables, the would be defined as follows:

$$e_{jnt} = \begin{cases} 1 & \text{if workcenter } n \text{ processes time } j \text{ in time period } t \\ 0 & \text{otherwise} \end{cases} \quad \text{(Eq. 9)}$$

To ensure that $e_{jnt}$ is nonzero only when work center n processes item j in time period t, the following constraints are imposed:

$$e_{jnt} \leq g_{jn}\left[p_{jt} + \sum_{k=1}^{W} w_{jkt}\right] \forall j = 1, K, N; n = 1, K, C; t = 1, K, T \quad \text{(Eq. 10)}$$

and $$g_{jn}\left[p_{jt} + \sum_{k=1}^{W} w_{jkt}\right] \leq b_{nt}e_{jnt} \forall j = 1, \quad \text{(Eq. 11)}$$

$$K, N; n = 1, K, C; t = 1, K, T.$$

Note that if item j is an artificial item corresponding not to the first operation in some routing, but rather to some operation other than the first, then the constraints above would have no summation over $w_{jkt}$. The first set of constraints ensure that $e_{jnt}=0$ if there is no production of item j on work center n in time period t. The second set of constraints ensure that $e_{jnt}=1$ if there is production of item j on work center n in time period t. The scaling of the first set of constraints assumes that the capacity resource units are large enough that production of one or more item units consumes one or more capacity resource units. Otherwise, the right side of the first set of constraints should be multiplied by a sufficiently large scaling factor, to ensure that the right side's value is always greater than one whenever the production quantities are strictly positive. The second set of constraints is already appropriately scaled, since the total capacity availability provides an appropriate upper bound.

The manufacturing capacity constraints can now be stated as follows in Equation 12:

$$\sum_{j=1}^{N} g_{jn}\left[p_{jt} + \sum_{k=1}^{W} w_{jkt}\right] + \sum_{j=1}^{N} e_{jnt}h_{jn} \leq b_{nt} \forall n = 1, \quad \text{(Eq. 12)}$$

$$K, C; t = 1, K, T.$$

Setting the $e_{jnt}$ variables as described in Equations 9–12 means that the set-up times will not be underestimated, but might be overestimated, because in every time period in which the user builds an item j on work center n, the set-up time will incur. But if one batch of time j spans more than one time period on work center n, set-up time is included only in the first time period for that batch, and not in subsequent time periods. This potential overestimation of set-up time means that supply might slightly underschedule capacity resources, but Supply planner 200 will not overschedule them.

If the user instead decides to approximate the fixed assembly time, the user need only reduce $b_{nt}$ by an amount corresponding to percentage of time work center n spends in set-up mode. If this reduced capacity is denoted as $b^3_{nt}$, then the manufacturing constraints can be stated like this:

$$\sum_{j=1}^{N} g_{jn}\left[p_{jt} + \sum_{k=1}^{W} w_{jkt}\right] \leq b^3_{nt} \forall n = 1, K, C; t = 1, K, T. \quad \text{(Eq. 13)}$$

The objective function combines four goals: maximize customer service, maximize revenue, maximize margin, and minimize inventory cost. Users can assign these four goals different weights, depending on their company's objectives.

In measuring customer service, the user may wish to give preference to shipping orders on-time versus shipping them late or early. To do this, the user scales the $x_{it}$'s by a value factor, denoted by $\delta_{it}$:

$$\delta_{it} = \begin{cases} \dfrac{2}{1 + |t - (\text{need date})_i|} & \text{if } t \leq (\text{need date})_i \\ \dfrac{1}{1 + |t - (\text{need date})_i|} & \text{if } t > (\text{need date})_i \end{cases} \quad \text{(Eq. 14)}$$

This setting of $\delta_{it}$ in Equation 14 implies that on-time orders have the highest value (2); the greater the difference between the ship date and the need date, the lower the value; and orders shipped n periods early are worth twice as much as orders shipped n periods late. The (scaled) customer service function looks like this:

$$\text{maximized customer service} = \max \sum_{i=1}^{M} \sum_{t=1}^{T} \delta_{it}x_{it} \quad \text{(Eq. 15)}$$

The revenue function is the sum of the revenue associated with all shipped independent demands:

$$\text{maximized shipped revenue} = \max \sum_{i=1}^{M} \left( a_i \sum_{t=1}^{T} x_{it} \right) \quad \text{(Eq. 16)}$$

The margin function is the sum of the margin associated with all shipped independent demands:

$$\text{maximized shipped margin} = \max \sum_{i=1}^{M} \left( \beta_i \sum_{t=1}^{T} x_{it} \right) \quad \text{(Eq. 17)}$$

The inventory cost function ignores the value of work-in-process, and instead includes only "on-the-shelf" inventory:

$$\text{minimized inventory cost} = \quad \text{(Eq. 18)}$$

$$\min \left[ \sum_{j=1}^{M} \left( c_j \sum_{t=1}^{T} I_{jt} \right) + \left( c_j \sum_{k=1}^{W} \left( t_{jk} - \sum_{t=1}^{T} u_{jkt} \right) \right) \right]$$

The first double-summation term inside the square brackets in Equation 18 is the dollar cost of the items in inventory at the end of every planning period. The second term accounts for the cost of inventory already issued for work orders, but not yet consumed. As the issued inventory is consumed, the quantity consumed (represented by $u_{jkt}$) is subtracted from the quantity issued (represented by $t_{jk}$).

Users combine multiple goals by assigning strictly positive weights to more than one of the four goals listed above. In the combined objective function, each of the four functions is multiplied by its corresponding weighting factor. (If one or more goals is given zero weight by the user, then this goal does not influence the production schedule.) Let $\omega_{CS}$, $\omega_R$, $\omega_M$, and $\omega_I$ be the user-assigned weightings for customer service, revenue, margin, and inventory, respectively.

To accurately reflect the user-assigned weightings, the combined objective function must first scale each of the four functions above to make them roughly comparable. Consider a customer order with an associated revenue of $1,000 and assume the user wishes to maximize both customer service and revenue, with equal weights assigned to each. If a scaling factor is not applied to the functions above, then shipping the order on-time contributes a value of 2 for customer service and 1,000 for revenue—these contributions are far from equal. Several different scaling methods might be reasonable. In an embodiment, supply scales separate goals so that each term would have a value of at most one. Let $\gamma CS$, $\gamma_R$, $\gamma_M$, and $\gamma_I$ be the scaling factors for customer service, revenue, margin, and inventory, respectively. Supply sets these quantities as follows:

$$\gamma_{CS} = 1/\max(\delta_{it}); \quad \text{(Eq. 19)}$$

$$\gamma_R = 1/\max(\alpha_{it}); \quad \text{(Eq. 20)}$$

$$\gamma_M = 1/\max(\beta_{it}); \quad \text{(Eq. 21)}$$

and $$\gamma_I = 1/\max(c_j(\text{on-hand inventory} + \text{fixed scheduled receipts})_{jt}). \quad \text{(Eq. 22)}$$

In equation 22, the term "fixed scheduled receipts" refers to purchase orders, purchase requisitions, or work orders that cannot be cancelled or split. If the goal is to minimize inventory, then the inventory in any period should not exceed the on-hand inventory plus the fixed scheduled receipts; that is, items should not be produced (or received, in the case of purchased items) without being consumed in the same period.

The combined objective function looks like this:

$$\max \left[ \omega_{cs} \gamma_{cs} \sum_{i=1}^{M} \sum_{t=1}^{T} \delta_{it} x_{it} + \right. \quad \text{(Eq. 23)}$$

$$\omega_R \gamma_R \sum_{i=1}^{M} \left( a_i \sum_{t=1}^{T} x_{it} \right) + \omega_M \gamma_M \sum_{i=1}^{M} \left( \beta_i \sum_{t=1}^{T} x_{it} \right) -$$

$$\left. \omega_I \gamma_I \sum_{j=1}^{M} \left( c_j \sum_{t=1}^{T} I_{jt} \right) + \sum_{j=1}^{M} \left( c_j \sum_{k=1}^{T} \left( t_{jk} - \sum_{t=1}^{T} u_{jkt} \right) \right) \right]$$

Note that in Equation 23, the inventory cost function is subtracted from the sum of the other functions to minimize inventory cost, but maximize all other quantities.

Resource Optimizer 300

Returning the FIG. 1D, the supply system 100 includes a resource optimizer (RESO) 300. RESO 300 is a supply application that allocates all supplies to the independent demands for a deliverable product. Whereas the supply planner 200 manages parts, the RESO 300 manages demand orders. RESO 300 establishes priorities and from the output tables, and modifies the priorities of independent demands. The user may use RESO 300 to generate reports that reveal where improvements can be made in the present schedule to make the best use of the user's resources.

The logic behind the supply planner 200 is similar to conventional MRPII systems. Specifically, the supply planner 200 is driven by factors such as: product structure, parts costs, availability and order policies. However, using conventional MRPII logic may obscure the relationships between independent demands and the supplies needed to meet those demands. Accordingly, the RESO 300 uses logic that reverses the effect of using conventional MRPII logic. Specifically, the RESO 300 restores the visibility the user needs by allowing the user to match the use of supplies to individual customer orders, master schedule items, and extra usage items. With a quick look into the supply planner 200 results through the RESO 300, the user can provide answers to questions such as the number of units to be produced by the end of the month; selecting the current orders that will produce the greatest revenue for the smallest investment; predicting how a drop-in order will affect the user's schedule; and predicting how capacity affects the planning schedule. The RESO 300 respects and uses the supplies and actions recommended by the supply planner 200 as the basis for reverse planning. The RESO 300 allocates all supply items back up to the user's independent demands, on a first matched-first filled basis. The user can employ the RESO 300 whenever a need for answers to the kinds of situations listed above but generally only after the user has run the supply planner 200 to produce a production plan. In particular, the user should have an accurate picture of the supply position in order to develop a clear view of how those supplies are allocated.

The RESO 300 generally requires a supply plan from the supply planner 200 (that is, the contents of the base Netting table or a separately defined Netting table) as its basic input. The RESO 300 may also use the data from other tables specified by the user, such as the Product Structure (PS), Customer Orders (CO), Master Schedule (MS), and Extra Usage (EU) tables described above. The RESO 300 stores this data in tables in the database 110, such as a Resource Optimization table and a Resource Optimization Detail (RESOD) table. The combined results from the RESO table and the RESOD table may then appear in a Resource Optimization Action table. The netting table from the supply planner 100 typically contains the full supply profile for every part in the ItemMaster (IM) table for which a requirement exists at any time between supply planner 200 run date and a specified supply planner 200 horizon date. The contents of the Customer Order, Master Schedule, and Extra Usage table, defined above, may also be inputs to the supply process (demands) and will, therefore, affect the results of the supply planner 200. With conventional MRP output, it is difficult to trace those relationships through all the layers of the Bill of Material (BOM) table, one level at a time.

Figure 3:
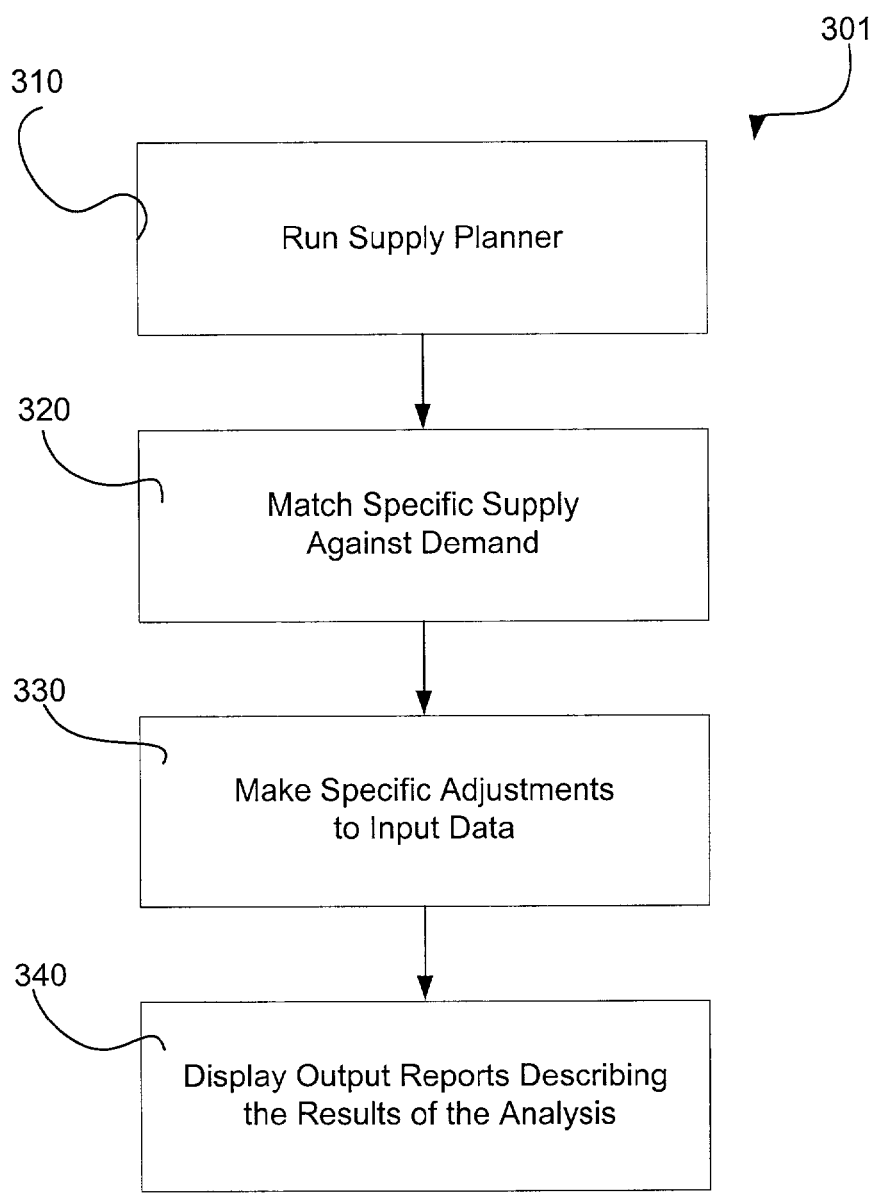

Therefore, the first step of a Resource Optimization method 301 in FIG. 3 is to verify that a Netting Table already exists with the result of a suitable supply plan, step 310. An example of an unsuitable supply planner 200 is one based on an out-of-date User plan. The RESO 300 will normally look at inventory to calculate possible quantities. However, by calculating possible quantities, other sources of supply may be considered. Possible quantities will look at Work Orders and other sources of supply if specified. For each supply source, the user may have the option of respecting or disregarding order dates to suit requirements.

The RESO 300 reveals and quantifies the relationships by associating the selected Customer Orders and/or Master Schedule items (that is, independent demands for products) back to the individual supply records in the Netting table. RESO 300 moves intelligently, through all levels, showing precisely how each will be satisfied. Each record in the RESO table is matched in sequence, based on the sort order defined for the table. This sequencing is represented by a peg number (each record of independent demand for a product) assigned automatically by the optimization process. For each of the peg numbers in the RESO table, the optimization process extracts and allocates the parts from the supply records listed in the Netting table to satisfy the demand.

A complementary function of the RESO 300 is to calculate and report Possible Quantity of parts (both products and components) that are theoretically available. Similarly, RESO may determine Possible Dates for availability of quantities that are required to meet the demands at each point in the RESO sequence. The Possible Quantity values and Possible Dates are generally in both the RESO and the RESOD tables. It is important to understand exactly what these values represent. The Possible Quantity of a part represents the quantity that is available after all previously matched demands for that part has been satisfied, whereas a Possible Quantity of zero means that all inventory and work orders have been allocated to peg sequence numbers of a higher priority. Because the parts listed in the RESO table identify the products for which there are independent demands, the Possible Dates of those parts reported in the RESO table represent what is possible to build at that point in a RESO sequence given the allocation of component parts that has already occurred at any previous point.

The parts identified in the RESOD table (that are not products) are the component parts that go into an organization's products. Possible Dates for these component parts represent the parts available for allocation to the independent demands at that point in the RESO sequence. This allocation reflects any allocations of that component part that has occurred at previous points.

When determining the Possible Date, the RESO 300 may determine an Available Date. The Available Date is calculated as the Supply planner 200 run date plus the longest lead-time of any shortage part. If the Possible Date is equal to the Supply planner 200 run date, this means that there are no shortage parts, and the organization has, in current inventory, all of the parts required to satisfy the Schedule Sequence Number. If the Available Date is greater than the Need Date for the Schedule Sequence Number then there is a part shortage. This shortage result causes the available Date to be pushed out by a measure equal to the cumulative lead-time of the part or parts that are short. The Available Date represents the date that it is possible to satisfy the independent demand specified by the product part number. This result is based on the availability of the component parts and the cumulative lead-time of any part shortages. For components, i.e., items that are neither products nor assemblies, the Possible Date represents the earliest availability of the part given actual supplies and supply planner 200 recommended supplies.

Normally, the RESO 300 will take the first available supply to meet demand. However, in some instances, where custom orders are a consideration, the RESO may match specific supply against demand, step 320. To allow for this, the supply system 100 allows the user to specify Match Project Sets. Match Project Sets uses project identification as a link between supply and demand. When the RESO 300 comes across a demand that has a project ID, the RESO 300 it will first look for a supply with the same project ID. If Supply does not find a supply with the same project ID, then it will use supply from PSOs.

Continuing with FIG. 3, the RESO 300 is specially designed to support a tweaking process after a default-driven optimization run. When the user views the RESO results after an optimization run, the user can make specific adjustments to the input data, step 330. For example, the user may adjust the optimization sequence by raising the priority number of individual demands. The user can also change Need Dates and Need Quantities and even add new demands directly in the RESO 300. The user can then run the RESO 300 again to see the effect of the changes. The RESO 300 also allows the user to make batch-type changes to the data during step 330. The rerun will use the supply information in the netting table last used by the optimization operation. Also, if the user adds demands to the RESO table the user must also add them to the appropriate Supply planner 200 input tables and run the supply planner 200 again so that there are supplies to match to the new demands.

As part of step 330, the user may also make adjustments to the priority in which the optimization operation addresses the demands on the RESO table. The supply system 100 makes these adjustments by changing the priority numbers on the RESO table. This feature may be done in a batch-like manner to allow the user to adjust the importance of a specific part or group of parts and/or orders(s) in a desired period. This adjustment may be based on all demands or a specific demand type. Also, the user may adjust the priorities several times on the same RESO table to see a variety of scenarios.

In another embodiment, the user may further define optimization sets. Optimization Sets are sequences of sorts and selections that the user defines. Each Optimization Set runs independently of any other Optimization Set the user may have defined. Generally, the user will only want to apply one Optimization Set to a particular RESO table. In this way, the user may specify certain goods or groups of goods to optimize.

Following the resource optimization analysis, the RESO 300 may form and display output reports describing the results of the analysis, step 340. In one embodiment, the RESO 300 may create a Detailed Order Status report to provide detailed information on the status of early or late orders or both. The Detailed Order Status report can be limited to specific sites or parts. The Detailed Order Status report may also be limited to a specific range of demands. The Detailed Order Status report has a variety of uses. Primarily, the report lets the user see how each order is supplied. The report specifies how individual components and their supply orders fulfill the top-level demand. After the details are available about how an order is supplied, the user can determine why an order is late.

Likewise, the RESO 300 may create a report summarizing what parts are used and needed. Specifically, a Where Used Summary report provides a summary of where parts are used and needed in the user's materials plan. The primary purpose of this report is to see how a lower level item is allocated to independent demands. This report is useful to analyze the optimal use of supply. By seeing the use of each part, the user can compare needs dates versus possible dates with relative ease, and then makes decisions on the priority of various orders.

The RESO 300 may also create a report projecting monthly shippable independent demand in the form of a Need/Available Summary report that provides a monthly projection in dollars of shippable independent demand items. This report provides a monthly projection, in dollars, of shippable independent demand items. It is key to assessing the investment required to meet the user's plan and shipping targets.

Another type of report that may be produced by the RESO 300 is a Late Orders report that provides a summary of all late orders. This report creates summaries of all late orders, either by part number then by need date, or need date and then part number, as specified in the Late Orders Report dialog box. By looking at this report in conjunction with the Master Schedule, the user will be able to determine the best way to satisfy the late orders with the supply available.

Similarly, a Shortage Parts Summary report identifies shortages of parts at the summary level. The user can produce a synopsis of parts that are the specific responsibility of a buyer(s) or a planner(s). This report is designed to quickly identify part shortages. Through the summary details on each part, the users are able to identify on-hand parts, parts that are on order, and the net requirement position. Using the Shortage Parts Summary, buyers and planners are able to see their particular situation rather than sorting through volumes of data on part shortages for the entire company. This is also a good place to determine if a particular part is a problem over many periods or if the problem is isolated to be a shorter horizon.

The RESO 300 may further prepare an Ontime Orders report that provides the user with a summary of the schedule for orders that will be on time or early. The Ontime Orders report is useful for evaluating which orders will be early and on time. With this information, the user might want to set up a an alternative shipping schedule if many orders ahead of schedule. By looking at the early orders from this report, compared to the late and shortage parts from the Late Orders report and the Shortage Parts Summary report, the user may see which orders could be reprioritized to meet need dates, and thus optimize the use of resources.

Another report, the Where Used Detail report, provides a detailed summary of where parts are used and needed in the user's materials plan. The Where Used Detail report time phases supply and demand at the component part level. The supply schedule includes a calculation for the projected available supply for each period based on the inventory and purchase orders scheduled. The demand section identifies the Schedule Sequence Number, the parent demand part number, the type of demand, demand quantity, and due date. Then for each period, the quantity of the component part allocated to the demand is specified. From the time-phased supply versus demand, the user can identify the prioritized demand to assist in rescheduling around critical shortage parts.

Continuing with step 340, the RESO 300 may present a Capacity Detailed Order Status report that provides a detailed status of the capacity for early or late orders or both. The report can be limited to specific sites or parts. It can also be limited to a specific range of demands. The Capacity Detailed Order Status report has a variety of uses. Primarily, the report provides visibility into how each order is supplied. The report specifies how individual components and their supply orders fulfill the top-level demand. Once the details of how an order is supplied are available, the user can better determine why an order is late. Specifically, by identifying a critical capacity order path, the user may isolate the delayed part.

Furthermore, a Purchase Order Action report shows all of the Purchase Orders (PO) or Planned Supply Orders (PSO) suggested by RESO 300. The user may focus the report on the purchase orders that the user wants to review. This report is essentially a buyer's tool, and the user may restrict the report to a specific buyer, or get a more global view of the situation by including all buyers. When looking at this report with PSOs included, a buyer can determine which orders should be considered to meet demand requirements. From this report, buyers also can review the purchase orders that have been placed against the actions (such as push, pull, or cancel) recommended by the RESO 300. If the action is achievable, the buyer can then attempt to put the action into effect. Overall, this Purchase Order Action report will provide a quick view of purchase orders with actions.

Constraint-Based Master Planning Component 400

Returning to FIG. 1D, another component in the supply system 100 is a Constraint-Based Master Planner (CBMP) 400. The CBMP can determine the user's material constraints and, optionally, the implementation of capacity constraints. This feature incorporates the functionality of demand planning, as in RESO 300, with a Finite Resource Planner 800, described below, to accommodate load and capacity requirements. CBMP 400 determines a production schedule that satisfies the user's material constraints and, optionally, capacity constraints. When compared to RESO 300 and FRP 800, the CBMP 400 uses linear programming methods to solve material and capacity planning problems. These advanced mathematical algorithms give the CBMP 400 the decision-making capability to build an order based on its impact on the production schedule.

The CBMP 400 may be used for planning. For instance, sometimes, even though all parts are currently available to build an order today, it is more advantageous not to build it, because making the decision not to build it today frees up these parts to complete three other orders tomorrow. Conversely, that one order today can belong to a best customer and the decision to build it today might be made regardless of the consequences to the overall schedule. The CBMP 400 has a global view that enables the CBMP 400 to avoid poor decisions early in the schedule and, for this reason, the CBMP 400 is able to determine better overall solutions to production planning problems. At the same time, the CBMP 400 includes the flexibility for the user to identify different priority groups and, thereby allowing the user to promote the building of high-priority orders whenever possible.

Figure 4:
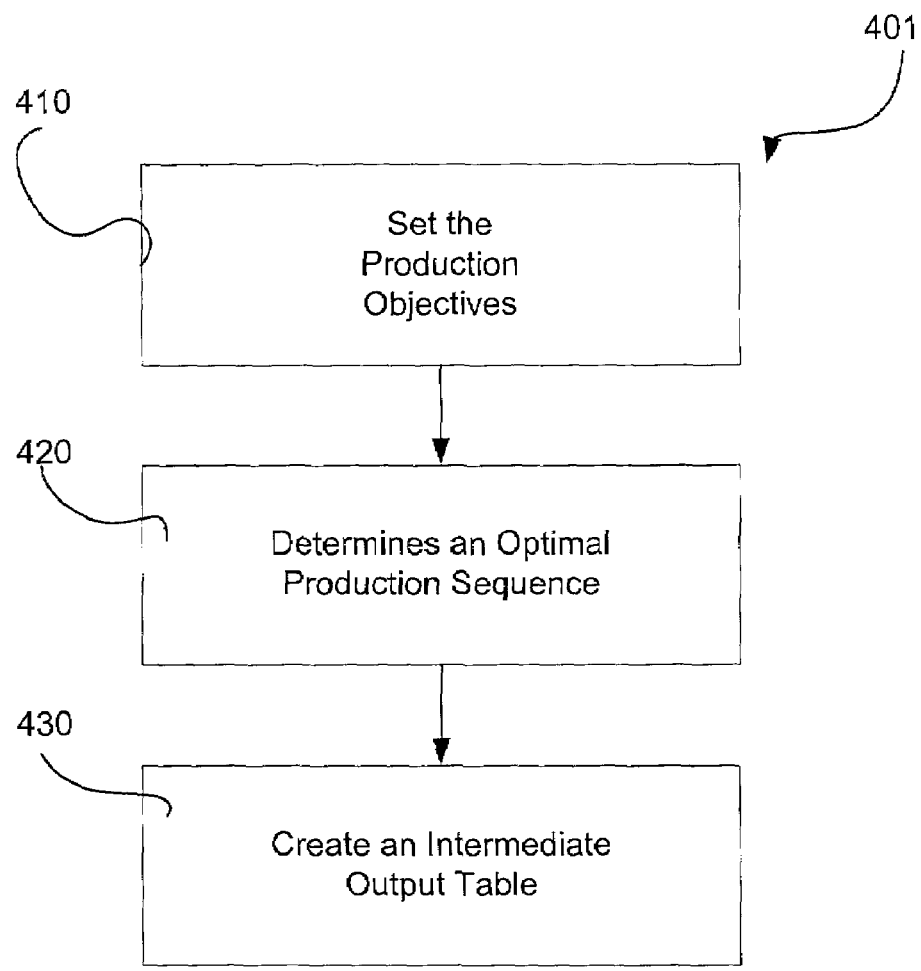

The constraint-based master planning method 401 is depicted in FIG. 4. In particular, the CBMP 400 allows the user to set the production objectives that make the most sense for the user's organization, step 410. In step 410, the CBMP 400 can be adjusted on a scale of less important to more important to correspond to the relative priority weight the user wants to attach to four possible goals: (1) Revenue that represents the total revenue for all shipped orders; (2) Margin that represents the total margin (dollar value) for all shipped orders; (3) Inventory that is based on the dollar value of all items in inventory at the end of each period (as defined in the user's CBMP options); and (4) Customer Service that is a representation of the number of on-time orders. If orders can be shipped early or late, the Customer Service goal will maximize the number of orders shipped on or near their due dates. In one embodiment, the user may view and set the relative importance of each goal by dragging a slider bar, indicating whether the user feels the goal is less important or more important other others priorities.

In addition to the defined goals described above in step 410, the user can also defining constraints to set priorities and preferences for optimizing a plan. For instance, the user may define Phases. There are several reason the user may want to define a series of phases over the horizon period. For instance, the user may want the priorities to change over the course of the user's Supply Plan to better resemble the user's manufacturing cycles. Let's say the user has a six-month horizon, and for each quarter the user wishes to: (1) emphasize customer service for the first two months of the quarter, and (2) emphasize revenue for the last month of the quarter. To reflect this emphasis, the user can set CBMP 400 goal priorities to match the user's cycle priorities by (1) in the phase covering the first two months, the user would tell CBMP 400 to emphasize customer service, (2) for the third month phase, set CBMP 400 to focus on revenue as the user's priority, and (3) the settings of the third and fourth phase would repeat those of the first two. After running CBMP 400 with these settings, the Supply Planner 200 and Resource Optimizer 300 will more accurately track the user's manufacturing priorities.

In step 410, the user may also specify a maximum number of orders per optimization cycle. In this way, the user may specify a upper bound to proposed production levels. A prespecified, suggested value may be formed based on the number of constrained parts the user has and the number of periods in the user's planning horizon.

After the user specifies production objectives, the CBMP 400 determines an optimal production sequence for the independent demands in a RESO table in step 420. The creation of the optimal sequence may be implanted using known techniques. For instance, the systems and methods of the above-cited U.S. Ser. No. 09/984,327 may be used to determine the optimal production sequence using the data contained in the RESO table or other tables in the database 110.

The CBMP may then create an intermediate output table, step 430. The CBMP may further resort the RESO table according to the identified production sequence, and afterward run the RESO 300 with the Best Fit Supply Allocation logic described above. The intermediate output table records the planned supply orders that CBMP 400 created to achieve its plan, as well as any actions that CBMP performed on scheduled receipts. The RESO 300 may use the information in this intermediate table to determine the latest supply that can satisfy demands in the CBMP sequence. Afterward, RESO 300 records its results in the RESO and RESOD tables as in accordance with its normal operation described above. In this way, the user may create a variety of RESO reports to view the results of a CBMP run.

The user may also specify capacity constraints in step 410. If capacity constraints are included, then CBMP 400 simultaneously considers both material and capacity constraints to determine a plan, in step 420. This plan respects material inventories and lead times, and also ensures that the planned load on the work centers never exceeds the available capacity. With capacity constraints, the CBMP 400 executes an finite resource planning at the end of its run (after RESO) to record the detailed capacity requirements in the RESOD tables and a Finite Resource Planning (FRP) table and, and to record the capacity available date in the RESO table. The user then uses the FRP reports to view the results of the user's capacity-constrained CBMP run. The user can also have the CBMP 400 respect the priorities established when the user applies Rule-Based Optimization described below.

Product Change Analyzer 500

The Product Change Analyzer (PCA) 500 helps the user to quickly identify the most cost-effective date to introduce new parts and products, while avoiding excess and obsolete inventory. Product Change Analysis scans the database 110 and, using parameters specified by the user and shows the user the optimum time for a phase-out or phase-in of a new product line or structure. Specifically, the user can use the PCA 500 to: (1) determine how changes to product designs or new products will affect inventory; (2) help the user identify when to implement the changes as a measure of the excess inventory that will result; and (3) help the user analyze changes as simple as a single-part substitution and as complex as the introduction of a new product line with the concurrent phasing out of an old one.

Overall, the PCA 500 helps the user to respond to changes. In manufacturing, the phase-in (i.e., introduction) of replacement components and phasing-out (i.e., the ceasing of use) of replaced components for a product are required from time-to-time, often due to engineering changes. Products may also change due to the introduction of a new product or line of products into the manufacturing cycle or the elimination of an old product or line. Whether the users are dealing with a single component part replacement or an entire line of products, the user may implement the PCA 500.

The PCA 500 is used to investigate the effects of component replacements. These kinds of changes in product structure or make-up may be necessary for a variety of reasons such as: taking advantage of competitive component pricing, adjusting to a fluctuation in the availability of parts supplies, incorporating engineering changes, and starting a new product line or phasing out an old product line. In some cases, a change to the components of a product is necessary to preserve that product's functionality. This type of engineering change is typically made immediately to ensure the continued success of that product. However, where a change in product structure is driven by finances or technology, then the question of when to make the change is more difficult to answer. The PCA 500 is designed to help the user determine the value of products or parts that will be unconsumed (obsolete). The PCA 500 provides the user with a report that shows the part number, period of effectiveness change (iteration), baseline value, and value at the time of the change, if the change is made.

In the following example, the structure of a Product A currently includes component a Part B that will be replaced by component Part C. Unless Part B is also being used in other products, removing it from the structure of product A right away is likely to cause an increase in obsolete inventory. Any Part Bs in the user's stock room and any Bs on order will be left to gather dust. This could represent a substantial loss to the user's company. To reduce the loss, the user must determine when and how much of the existing inventory of Part Bs can be absorbed before the component change and how many of the Bs on order, if any, will really be required before the change. The problem becomes increasingly difficult if Part B happens to be an assembled part with other component parts associated with its own structure.

Figure 5:
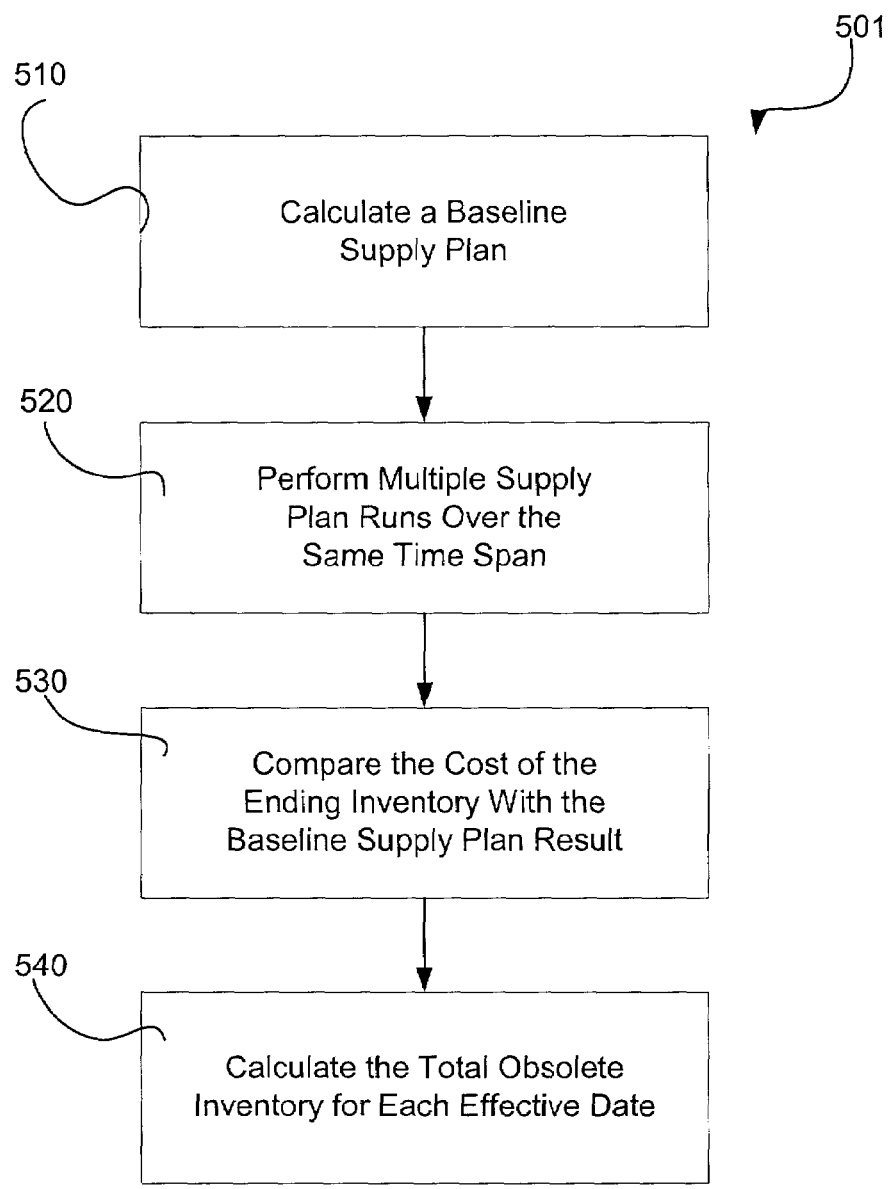

The operation of the PCA 500 according to the PCA method 501, as depicted in FIG. 5. The PCA 500 has the supply system 100 calculate a baseline Supply Plan result, step 510. Then, the PCA 500 has the supply planner 200 perform multiple Supply Plan runs over the same time span (step 520), compares the cost of the ending inventory with the baseline Supply Plan result (step 530), and calculates the total obsolete inventory for each effective date (step 540). The PCA calculates a baseline Supply Plan result from a specified Product Change start date to a Product Change Horizon date, where the Horizon date is the last of the planning periods to be analyzed. The baseline Supply Plan result does not reflect the product change, but does reflect every other aspect of the material plan.

In the above example, this means that Part C has not yet been put into effect with respect to Product A. From the baseline Supply Plan result, the PCA will determine the ending inventory (cost) for each and every part in the user's material plan (not just the parts associated with Product A). This becomes the user's baseline obsolete value. Next, the PCA 500 performs multiple Supply Plans over the same time span, at increments determined by the number of planning periods and the granularity of those periods, which the user set. The first of these runs determines the Supply Plan results where Part C replaces Part B immediately (at the Start Change date).

The Subsequent runs in step 520 push the replacement date (Effect Date) out by one planning period. In each of these runs, the PCA calculates the ending inventory (in dollars) for each part in the plan. The ending inventory for each part is then compared to that of the baseline Supply Plan. The differences are calculated and summed up to a single value representing the total obsolete inventory which would result from the component replacement at each effective date. The only differences among Supply Plans during the entire process are those caused by the replacement of parts (e.g., Part B with Part C). Using the above example, it can be seen that the further the change effect date is pushed, the greater the amount of Part B that will be absorbed by demands, and hence, the lower the user's obsolete inventory of Part Bs. However, the further the effective date is pushed, the production loses the from change to Part C. With no other changes in the material plan, the PCA 500 produces a report, the PCA report, that shows that the longer the user waits to replace Part B, the less obsolete inventory the user will have.

A Product Structure table, as defined above, plays an important role in the PCA 500. Once the Product Change has been defined, and before attempting to run the PCA, the user should ensure that all remove/replace parts in the Product Change exist and are correctly defined in the ItemMaster table. Furthermore, the user should also ensure that any newly defined parent/child relationships are not in effect prior to the PCA. Two fields in the Product Structure table determines when a part is in effect—the Start Effectivity Date and the End Effectivity Date. The purpose of the PCA 500 is to help determine what these dates should be as compared to the baseline, existed Supply Plan. If the part's parent/child relationship already exists in the Product Structure table, and its effectivity date is set on or later than the Start Change date (that is, within the time frame of the Product Change), the part changes will be included as a baseline condition by the PCA 500.

In one embodiment, the user may change the granularity of the periods used by the PCA 500, usually causes a shift in the supply profile over time. The supply plan 200 may recommend actions on specific supplies, where the recommendations can vary from run-to-run so that orders get pushed and pulled differently. This carious can result in obsolete inventory that does not decrease uniformly and may even increase over time. On cause for the various in supply plan results is that a part being replaced has an order policy that dictates ordering more than is required to meet the demand, as opposed to exactly what is required. For example, if the part being replaced has a minimum order quantity, or quantity multiple imposed on it, the supply planner 200 may create more supplies (that is, recommended orders) than are required, resulting in obsolete inventory for that part. In another example, obsolete inventory can grow from one Product Change period to the next when a large purchase order is pulled in. In other words, a Supply Plan recommended reschedule creates the supplies earlier to provide for a small demand, leaving the bulk of the order obsolete. If the part being replaced is an assembly, the one or more of these scenarios could be affecting the component parts of the assembly being replaced.

Following the above described analysis, the PCA 500 may write its results to a PCA Results table, step 550. The results may also be presented in a PCA report, in step 550. The PCA report provides a complete review of the rolling out value of the product change per period, to the point where the value of the projected obsolete inventory equals zero. Although this is the optimum time to make a product change, it may not be practical. From this report, the user can compare factors such as opportunity costs against the value of the remaining inventory at any period to calculate his/her real cost of a product change.

Comparer 600

Returning to FIG. 1D, another component in the supply system 100 is the comparer 600. With the supply system 100's ability to run a variety of scenarios and view the results in a short time, certain advantages become apparent. The user can take advantage of this speed capability by changing and fine-tuning the material plan with multiple Supply Plans instantaneously. Therefore, with multiple Supply Plans, it is a simple task to compare the results of more than one run. The comparer 600 has been developed for just this purpose—to compare and report the differences between the results of any two Supply Plans. The comparer 600 gives the user the power to compare one supply plan with another and inspect the differences between the two at several levels of detail. The comparer 600 is a fast and effective means of determining how specific changes to the user's production plan might affect the inventory, even to the level of the individual parts.

Figure 6:
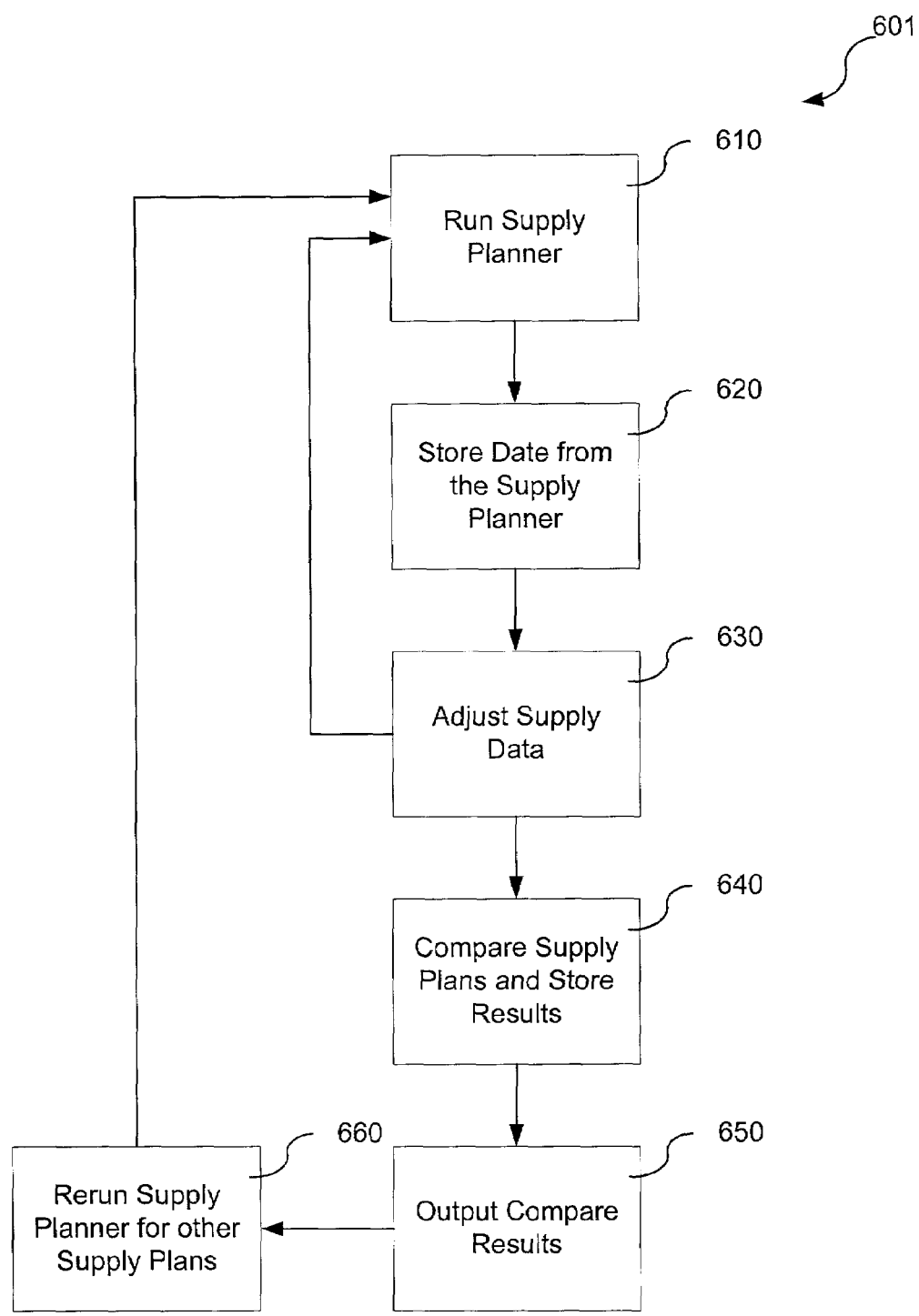

A compare method 601 is depicted in FIG. 6. The compare method 601 governing the operation of the comparer 600 is now described using an example. The user runs the supply planner 200 one time, step 610, using current data such as the ending balances from the previous day's activities. Next, the user has creates and names a table, such as a Netting table, to hold the results of that Supply Plan, step 620. In the present example, this first Netting is named NET. Now, if the user wants to analyze the effect of a large drop-in order of other changes, the user may simply update the Customer Order (CO) table, defined above, to include the information from the drop-in order and rerun the supply planner 200, step 630. Following the second operation of the supply planner 200 using the adjusted data in step 630, the user creates a new table NET1 to store the results from the second implementation, step 640. The user is then left with two tables, Net and Net1 that can be used by the comparer 600. Specifically, if there is any difference or variance between the ending balances in the two Netting tables, in any period, the comparer records the differences in a Compare Results (CR) table, step 650. This routine is repeated for each part in the base plan until all parts found in the base have been visited, step 660. Then, the Comparer 600 will calculate the total variance for each period and store the findings in the CR table.

The above-described compare netting approach is best suited for fast comparisons between the contents of two Netting tables, both of which contain supply planner results derived from the same ItemMaster (IM) table. Specifically, neither the number nor the sort order of the parts in the IM table could be changed for either operation of the supply planner 200. As described above, the Comparer 600 is generally used to compare the results of two Netting tables. The first table is usually generated from the most recent Supply Plan, based on the user's current situation. To ascertain the results of an actual event such as an arrival of a drop-in order or a hypothetical event such as a proposed change in order policy. By making the necessary changes in the database 110 to accurately describe the change of interest and running a second Supply Plan, a new Netting table is created reflecting the change. These two netting tables can then be compared to assess the net effect of the change. Based on inputs selected in the user, the differences for each part in the Netting tables for several categories and periods are calculated. If there is any difference (referred to as a variance) between the ending balances in the two Netting tables, in any period, it is recorded in the Compare Results table. This routine is repeated for each part in the Item Master table. A difference can be represented as a quantity or a monetary value. At that point, the Comparer 600 calculates the total variance for each period and stores the findings in the Compare Results table. The quantity variances, as defined below, are calculated by the Comparer 600.

Using the data in the CR table, the comparer 600 may automatically create compare reports. The Compare report provides a view of the variance in quantity or cost for all parts with a difference in the ending balance in the two Netting tables being compared. For instance, the compare report may include a detailed listing of each part with a variance in a period. Variances are displayed by variance type per period/part as selected, with total variance for each variance type and part/period as selected. Similarly, the compare report may provide a total variance per period of all parts, or a total variance of a particular part for the entire period requested for each cost variance option. That is, the user will see a total variance in period one for material cost, labor cost, and so forth. A total cost is provided to assist in the user's analysis. Reports will vary depending on the compare option selected by the user, that is, inventory balance, all demands, all supplies, Planned Supply Orders (PSO), or scheduled orders. The compare report may further display the variance in actions (that is, cancel, push, pull new) between two proposed supply plans as represented in two Netting tables. This type of report provides a summary of the actions that must be performed to make the new Supply Plan work. The user may then review the list by part to see what actions should be taken, and the total cost differences (variance) between the two plans.

Resource Requirement Planner 700

Returning to FIG. 1D, the supply system 100 may further include a Resource Requirements Planner (RRP) 700 for converting the Master Production Schedule (MPS) created by the supply planner 200 into requirements for key resources. These key resources often include labor, machinery, warehouse space, suppliers' capabilities, and in some cases, money. Comparison to each available or demonstrated capacity is usually carried out for each resource. This comparison assists the user in establishing a feasible master production schedule. The RRP 700 functions primarily to determining key resources with resources to fulfill requirements. For instance, if a workstation becomes overloaded it assumes the user will do something like add an extra shift.

Figure 7:
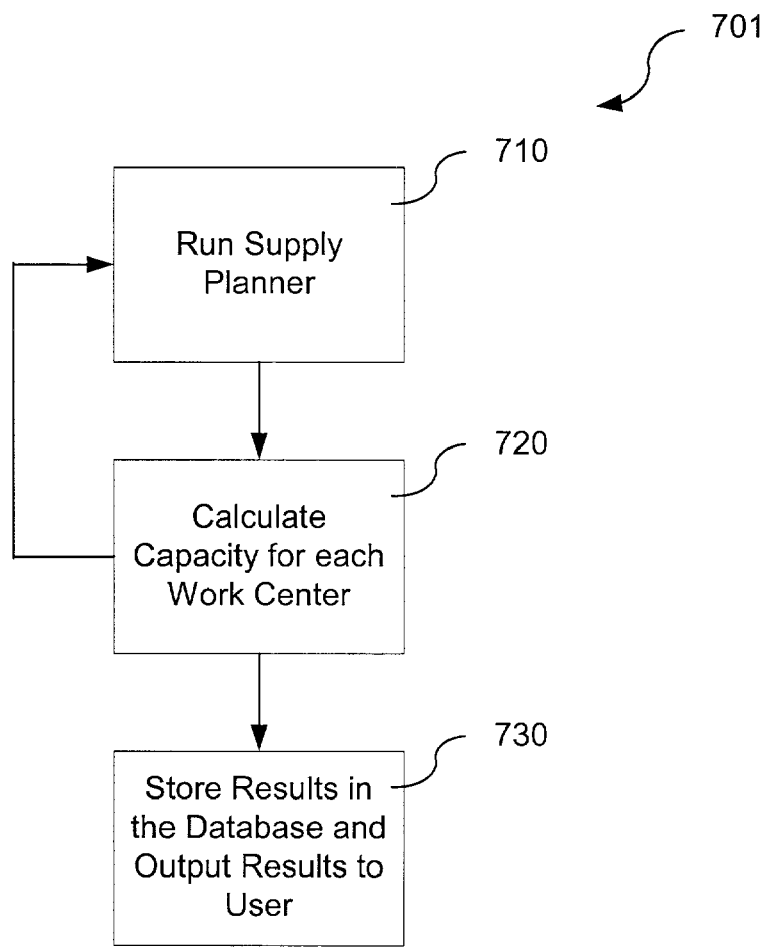

The operation of the RRP is summarized in FIG. 7. In particular, the RRP method 701 starts with the user first running the supply planner 200, step 710. The RRP 700 then calculates the capacity of each work center, for each period until the end of the horizon period, step 720. The capacity is replenished at the beginning of each period. For each supply order that is scheduled, the RRP 700 calculates the load on the various work centers. The necessary information is held in the Work Order and Netting table, defined above. The remaining quantity on the Work Order or Planned Supply Order is used, with specific Representative Routing for the item, to calculate the load requirement at each Work Center. If a Work Order is partially completed and in process, the state of order will be addressed by accessing the Last Routing Complete and Routing Percent Complete fields on the Work Order table for each Work Order. The routing operation number specified in the Last Routing Complete field assumes that all previous operations are also complete. The percentage value in the Routing Percent Complete indicates the percentage of load that has been completed on the next operation after the operation specified in the Last Routing Complete field. The remaining percentage is used to calculate the remaining load required to complete that operation. It is assumed that all succeeding operations are not started and therefore have the entire load remaining. All this information is held in a Rough Cut Details (RCD) table. After the run is complete, the RRP 700 creates a RRP table, step 730, that breaks down the capacity per load for each work center.

The RRP 700 generally acquires information from different tables including a Work Center table (WC), a Representative Routing table (RR), a Resource Requirements Plan Action table (RRP), a Resource Requirements Plan Periods table (RRPPER), and a Work Order table (WO). The capacity for each Work Center is calculated from the WC table. For each Work Center, minimum and maximum capacity fields are represented. The RRP then uses the Work Order records from the Netting (NET) table as the Master Planning Schedule source of supply. For each order that is scheduled, the RRP calculates a load from each of its routings found in the RR table. The loads are arranged by work center and entered into the RRP table.

In step 730, the RRP 700 may also create various reports summarizing its findings including as to Work Center Load Detail, Work Center Load Profile, and Work Order Profile. The Work Center Load Details report lists information by work center, by period, and the work to be performed. For each work order, the report shows the percentage of the total work center capacity that is required. Therefore, the user can review the priorities of a work center to meet outstanding demand, or the user can see if a work center is under/over utilized and then make the necessary management decisions. In comparison, the Work Center Load Profile report provides a profile of the capacity for a specified work center and displays the maximum, normal, and planned capacities, along with the planned load. The total planned capacity is compared with the total planned load to arrive at a variance for the work center. This variance can then be analyzed for workload distribution and resource scheduling. Continuing with the third type report, the Work Order Profile report provides a visual representation of load versus capacity per period. This report allows the user to follow a Work Order through the various centers to determine if the Work Order will be completed on time, and if not, which Work Center is not working to schedule. For each Work Center, the capacity available to complete the Work Order is clearly shown, as well as the percentage of the Work Center that will be committed to the selected Work Order.

Finite Resource Planner 800

Finite Resource Planner (FRP) 800 is very similar to the RRP 700. In particular, the FRP 800 converts the MPS to requirements for key resources that may include labor, machinery, warehouse space, suppliers' capability, and in some cases, money. However, unlike the RRP 700 that identifies capacity shortages and excesses so that the user can take appropriate actions, the FRP 800 assumes the planner is willing to accept capacity shortages and wants to adjust the plan to produce an optimal production schedule given the capacity shortages. The FRP 800 moves work around to ensure that load never exceeds capacity because resources are finite and manufacturing schedules must work around this constraint.

The FRP 800 performs the various tasks including (1) determining the available ship date of independent demands based on material and capacity availability; (2) calculating the load on all work centers; (3) calculating which assembled supply orders are causing independent orders to be late; and (4) pinpointing production bottlenecks, where a bottleneck is the first routing step that prevents an order from being available on time.

Figure 8:
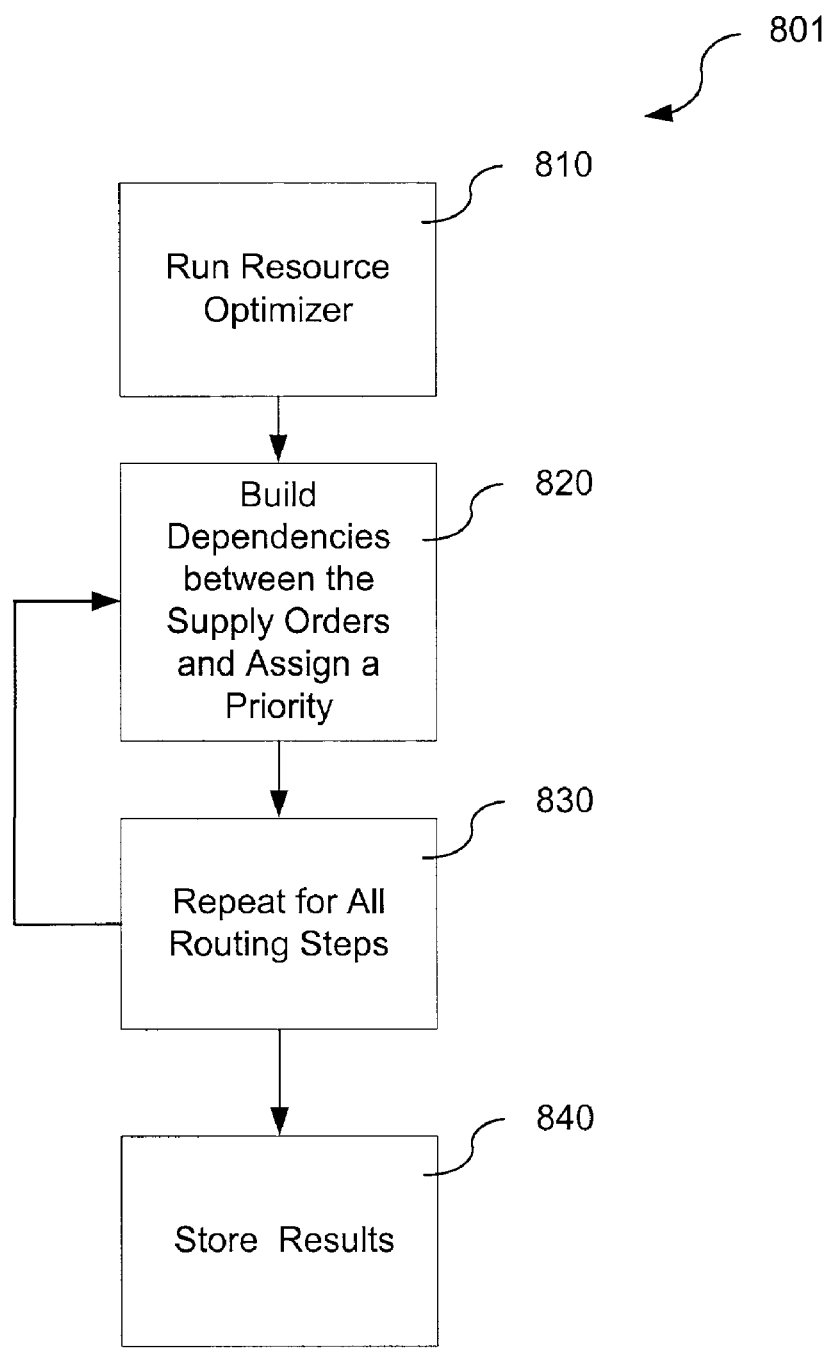

The operation of the FRP 800 is summarized as FRP method 801 in FIG. 8. The FRP 800 works on the outputs of the RESO 300. Therefore, the FRP waits for the completion of the operation of the RESO 300, step 810. The FRP 800 then uses the RESOD table builds the dependencies between the supply orders and assigns a priority to these orders, step 820. In the RESOD table, supply orders are ranked first by peg number and secondly by low-level code, as described above. The FRP 800 also obtains material availability dates from the RESOD table. For each peg number, the FRP 800 starts at the bottom of the bill of material (BOM) and works its way up to the top, carrying up the available date of all intermediate supply orders. The end result is a material and capacity available date for the complete independent demand. The available date of a supply order is the date when the last routing step has been finished, assuming the order has routings. If it has no routings, the available date is the child's available date plus lead-time. For a supply work order that has a routing, and work has not yet started on the order, the first routing step begins when all the material is available. This is known as the start date of the order. From the start date, the loading process occurs for each routing. The FRP 800 places loads on dates on which available capacity exists. The FRP 800 then obtains capacity information from the Work Center table. If there isn't enough capacity on a given day, the FRP 800 will consume capacity on the next date where unused capacity exists. This routing step continues until all the load has been positioned in the work center. When the first routing step is completed, the second one begins, and so on until all routing steps are complete, step 830.

For any in-process Work Orders, some portion of the work has already been performed. The status of the order may be stated by the Last Routing Complete and Routing Percent Complete fields for each in-process order on the Work Order table. The FRP 800 examines each Work Order will be examined to determine its status. If there is a valid operation number in the Last Routing Complete field, the FRP 800 assumes that the current operation and all preceding operations have been completed. If there is a valid percentage in the Routing Percent Complete, the FRP 800 assumes that percentage has been completed on the next routing operation after the one mentioned in the Last Routing Complete field.

Normally, all material will be considered available for in-process orders, using the assumption that the material must be available prior to work starting. However, if there are open, unissued Actual Requirements attached to the Work Order, the RESO 300 will have calculated an available date for the material. The FRP 800 then assumes that work cannot continue until the material is available. At that time FRP 800 will continue calculating load against available capacity. For each routing step, the FRP 800 calculates a need-completion-by date. This date is the last date on which the step can be completed on without causing the order to be late. It is useful in pinpointing bottlenecks, and the FRP 800 calculates these dates by a backward scheduling method that assumes the daily maximum available capacity.

The results of an FRP run are stored in the FRP table, step 840. The FRP table has a similar format to the RRP table. In step 840, the FRP 800 may run reports on an FRP table, such as the ones associated with RRP 700. In addition to the reports described in the RRP 700, the FRP 800 may produce a Capacity Detailed Order Status report. The Capacity Detailed Order Status report pinpoints the supply orders that are causing an independent demand to be late. This report is very similar to the Detailed Order Status report, which exists under RESO. The main difference between the two reports is that the Capacity Details Order Status report returns capacity and material available dates whereas the Detail Order Status report returns only the material available dates. The Capacity Detailed Order Status report provides visibility into how each order is supplied. The report specifies how individual components and their supply orders fulfill the top-level demand. From this report the user will have a view of the status of the user's supplies to make decisions on how the user will best overcome the late order situation. Once the details of how an order is supplied are available, the user can determine why an order is late. By identifying the Critical Path, the user can isolate the delayed part and determine if it can be expedited.

In another embodiment, the FRP report also shows all late supply items, not just the critical path items. If the user is attempting to expedite a late order, she can determine a more realistic available date. If the user manages to expedite one part, the user can determine if a late order is still due to other component parts. If the user determines that the critical path part is now available on a certain date, the user can answer the question of whether other supplies will be available after that date.

Customer Promiser 900

Figure 9:
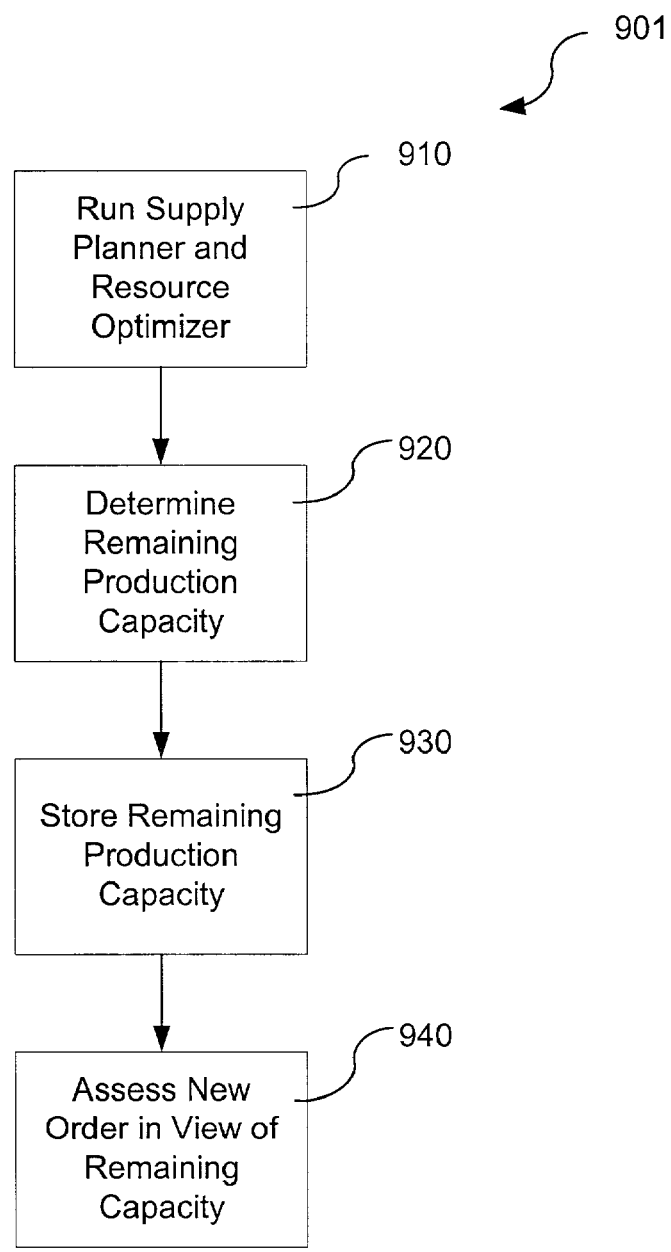

Returning to FIG. 1D, the supply system 100 may further include another component called the customer promiser (CP) 900. The CP operates to assist the user in quickly access the feasibility of a new order (a drop-in). In particular, the CP 900 allows the user to accurately promise the on-time availability of a new order. To summarize the operation of the CP 900 in the CP method 901, as depicted in FIG. 9, the supply system first operates the supply planner 200 and the RESO 300, step 910. Using these results from these and other components of the supply system 100, the CP 900 determines remaining production capacity given preexisting orders, step 920. The remaining capacity is stored in the database 110, step 930. When a new order arrives, the CP assesses the new order in view of the remaining capacity, step 940. In particular, the CP runs the supply planner using only the resources in the remaining capacity and the new order. If the new order may be completed using the remaining capacity, the user may reliably promise to fulfill the new order, step 940. It should be noted that supply plan formed in step 940 is not generally optimal and may never be employed. Instead, the supply plan merely suggest the feasibility of the solving a supply allocation problem that may be further optimized by rerunning the supply planner 100 for all of the orders and all of the production inputs.

Interactive Master Scheduler 1000

The Interactive Master Scheduler (IMS) 1000 feature lets the user automatically or manually modify forecast demand data for import through the interface to the Master Production Schedule. The IMS 1000 is an application designed for master schedulers in a manufacturing environment. The IMS 1000 allows master schedulers to employ proprietary business judgment in matching production forecasts with sales forecasts. The IMS 1000 operates in real time to adjust and create production forecasts that best reflect the current business environment. When all the required changes are completed, the Master Schedule table is populated and the Supply Optimization process begins.

IMS 1000 has an auto-leveler that adjusts the forecast to cover negative Available-to-Promise (ATP) if forecast for the part exists. The auto-leveler rolls any unused forecast forward to the remaining periods left in the month or quarter. Once the auto-level is finished processing, the IMS 1000 marks all families and parts to communicate the status (that is ATP, no ATP, or negative ATP) to the master schedulers. Master schedulers now have a prioritized action list of parts; the forecast for these parts needs to be reviewed and adjusted. Master schedulers can update the forecast using the drag-and-drop feature to move forecast from one period to another. As adjustments are made, IMS reduces the available quantity by the quantity moved. The master scheduler can also elect to add forecast, which results in an increase to the current plan. All adjustments made to the forecast are done so in a separate forecast line to preserve the original forecast. An audit trail of all changes can be kept in monthly files.

The IMS 1000 assists the user during three basic scheduling scenarios:

(1) When the Forecast Closely Reflects Customer Orders, here, the gross forecast is roughly equal to the number of customer orders and there is a positive number of Available-to-Promise orders. It is not necessary to shift period forecasts with auto-leveling, from one time bucket to another time bucket in the current quarter, to achieve positive ATPs. The Master Scheduler in this case does not need to adjust the forecast. This scenario is not often achieved without adjustments to the gross forecast.

(2) When Customer Orders Exceed the Gross Forecast (ATP), when customer orders exceed the forecast, it is necessary to perform a movement of period forecasts to areas where there are negative ATPs throughout the quarter. Resulting negative forecasts are rolled forward automatically within the period. This occurs during the first run of the IMS feature; negative net forecasts can be manually adjusted afterward. For example, two families can be displayed in split-screen mode and the user can move gross forecast from a cell that has positive ATP to a cell that has negative ATP. Additionally, the user can adjust positive ATPs between cells and is prompted for a value when doing so. The goal is to support given sales forecast and maintain positive ATPs between cells and is prompted for a value when doing so. The goal is to support given sales forecast and maintain positive ATP over each quarter. If the forecast is too much greater than the number of customer orders, an authorized user can cut and slow down the forecast manually over successive quarters of the fiscal year.

(3) When there is Greater ATP than Required in the Quarter, it is necessary to use auto leveling in IMS to perform a number of steps to deal with excess ATP for the quarter. The IMS table is populated first by adjusting the negative ATPs (denoted by X) and then the zero ATPs (denoted by "0"). Then the forecast is manually adjusted in areas where there are obvious problems to areas where there may be potential problems. IMS applied against excess ATP affects the sales forecast and helps validate previous sales projections. The Master Scheduler can apply resident business logic in moving the forecast to suit the particular build-to-order environment. After manually adjusting the forecast, the Master Scheduler can export the IMS table to the Master Schedule table and run a Supply Plan and associated operations.

The IMS table formed by the IMS 1000 consists of a family of assemblies that are based on the part list in the Gross Forecast, Customer, and Shipment tables. From these tables, ATP quantities are determined and used to address the type of questions described above. It is also important to remember that the parts family originates from the Item Master table.

CONCLUSION

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the system of the present invention may be modified as needed to meet the requirements of computer networking schemes and configurations as they are developed. It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A system for producing an optimal supply play for allocating a supply of a component, the system comprising:
    a) a computerized database containing electronically readable information related to said component, said information describing the supply and changes to the supply;
    b) a computerized supply planner that automatically produces a plurality of proposed supply plans for said component using synchronized allocation with the component information in the database, wherein each of said proposed supply plans has associated supply plan values comprising:
        $\alpha_i$ representing a revenue associated with a demand i,
        $\beta_i$ representing a margin associated with said demand i,
        $c_j$ representing a standard cost of an item j,
        $u_{jkt}$ representing a quantity of consumed inventory,
        $t_{jk}$ representing a quantity of issued inventory,
        $I_{jt}$ representing an inventory of an item j at end of a time period t,
        M representing a number of independent demands, and
        T representing a number of time periods;
    c) data input means for accepting user input, wherein said supply planner uses said user input to define user preference values comprising
        $\omega_{CS}$, $\omega_R$, $\omega_M$, and $\omega_I$ representing weightings for customer service, revenue, margin, and inventory for said component,
        $\gamma_{CS}$, $\gamma_R$, $\gamma_M$, and $\gamma_I$ representing scaling factors for customer service, revenue, margin, and inventory for said component, and
        $\delta_{it}$ representing a scaling factor to give preference for shipping orders on-time versus shipping late or early,
    wherein said supply planner evaluates the plurality of proposed supply chain plans using the associated supply plan values and the user preference values through an objective function comprising:

$$\left[ \omega_{cs}\gamma_{cs}\sum_{i=1}^{M}\sum_{t=1}^{T}\delta_{it}x_{it} + \omega_R\gamma_R\sum_{i=1}^{M}\left(\alpha_i\sum_{t=1}^{T}x_{it}\right) + \omega_M\gamma_M\sum_{i=1}^{M}\left(\beta_i\sum_{t=1}^{T}x_{it}\right) - \omega_I\gamma_I(\sum_{j=1}^{M}\left(c_j\sum_{t=1}^{T}I_{jt}\right) + \sum_{j=1}^{M}\left(c_j\sum_{k=1}^{T}\left(t_{jk} - \sum_{t=1}^{T}u_{jkt}\right)\right)) \right]$$

where $x_{it}$ is a binary variable;
    e) wherein said supply planner selects the optimal supply plan from the proposed plurality of proposed supply chain plans, wherein said optimal supply plan maximizes the objective function.

2. The system of claim 1 further comprising a computerized resource optimizer, wherein said resource optimizer uses automated matched sets logic.

3. The system of claim 1 further comprising a computerized product attribute defining tool.

4. The system of claim 3, wherein said computerized product attribute defining tool that accepts engineering specification information from a user and automatically defines the component by using the electronically readable engineering specification information.

5. The system of claim 1 further including a computerized constraint-based master planner, whereby said constraint-based master planner allows a user to automatically specify one or more electronically readable goals to be considered by the computerized supply planner.

6. The system of claim 5, wherein said goals comprise:
    a maximization of revenue,
    a maximization of margin,
    a maximization of inventory, or
    a maximization of customer service.

7. The system of claim 1 further comprising a computerized product change analyzer, wherein said product change analyzer automatically compares the effects of a change to the supply at different times.

8. The system of claim 1 further comprising a computerized comparer, wherein said comparer automatically assesses differences in an electronically readable first supply plan for the supply of the component and an electronically readable second supply plan for a modified supply of the component.

9. The system of claim 1 further comprising a computerized resource requirements planner, wherein said resource requirements planner automatically suggests a change in the supply to address a shortage identified by the supply planner.

10. The system of claim 1 further comprising a computerized finite resource planner wherein said finite resource planner automatically suggests an optimal use of the supply to address a shortage identified by the computerized supply planner.

11. The system of claim 1 further comprising a computerized customer promiser, wherein said computerized customer promiser:
    automatically determines a remainder of the supply following implementation of the supply plan, and
    automatically assesses feasibility of a new order using on the remainder.

12. The system of claim 1 further comprising a computerized interactive master scheduler.

13. The system of claim 1, wherein said database comprises electronically readable input data, electronically readable user-specified data, and electronically readable output data.

14. A method for allocating a supply of a component, the method comprising the steps of:
    a) providing a computer to a user;
    b) said computer forming a component database, said component database containing electronically readable information related to said component, said information describing a supply of said component and changes to the component supply;
    c) said computer producing a plurality of proposed supply plans for said component using synchronized allocation said computer using synchronized allocation with the information in the component database, wherein each of said proposed supply plans has associated supply plan values comprising:
        $\alpha_i$ representing a revenue associated with a demand i,
        $\beta_i$ representing a margin associated with said demand i,
        $c_j$ representing a standard cost of an item j,
        $u_{jkt}$ representing a quantity of consumed inventory,
        $t_{jk}$ representing a quantity of issued inventory,
        $I_{jt}$ representing an inventory of an item j at end of a time period t,
        M representing a number of independent demands, and
        T representing a number of time periods;

d) said computer accepting user input and using said user input to define user preference values comprising $\omega_{CS}$, $\omega_R$, $\omega_M$, and $\omega_I$ representing weightings for customer service, revenue, margin, and inventory for said component, $\gamma_{CS}$, $\gamma_R$, $\gamma_M$, and $\gamma_I$ representing scaling factors for customer service, revenue, margin, and inventory for said component, and $\delta_{it}$ representing a scaling factor to give preference for shipping orders on-time versus shipping late or early, e) said computer evaluating the plurality of proposed supply chain plans using the associated supply plan values and the user preference values through an objective function comprising:

$$\left[\omega_{cs}\gamma_{cs}\sum_{i=1}^{M}\sum_{t=1}^{T}\delta_{it}x_{it} + \omega_R\gamma_R\sum_{i=1}^{M}\left(\alpha_i\sum_{t=1}^{T}x_{it}\right) + \omega_M\gamma_M\sum_{i=1}^{M}\left(\beta_i\sum_{t=1}^{T}x_{it}\right) - \omega_I\gamma_I\left(\sum_{j=1}^{M}\left(c_j\sum_{t=1}^{T}I_{jt}\right) + \sum_{j=1}^{M}\left(c_j\sum_{k=1}^{T}\left(t_{jk}-\sum_{t=1}^{T}u_{jkt}\right)\right)\right)\right],$$

where $x_{it}$ is a binary variable;

f) said computer selecting the optimal supply plan from the proposed plurality of proposed supply chain plans, wherein said optimal supply plan maximizes the objective function; and g) said computer allocating said computer using said supply plan.

15. The method of claim 14, wherein said computer automatically defines the component using an electronically readable engineering specification.

16. The method of claim 14 further comprising the step of computerized optimizing of the supply using automated matched sets logic.

17. The method of claim 14 further comprising the step of computerized specifying of one or more goals to be considered in the step of producing a supply plan.

18. The method of claim 14 further comprising the steps of:
a) computerized modifying of said database to reflect a change in the supply at a first time;
b) computerized preparing of a first supply plan for said first modified database;
c) computerized modifying of said database to reflect the change in the supply at a second time;
d) computerized preparing of a second supply plan for said second modified database; and
e) computerized comparing of the effects of said first and said second supply plans.

19. The method of claim 14 further comprising the steps of
a) computerized modifying of said database to reflect a change in the supply;
b) computerized preparing of a modified supply plan for said modified database; and
c) computerized comparing of the effects said supply plan and said modified supply plan.

20. The method of claim 14 further comprising the steps of:
a) computerized identifying of a shortage in the supply created in said supply plan; and
b) computerized modifying of use of said supply to address said shortage.

21. The method of claim 14 further comprising the steps of:
a) computerized identifying a shortage in the supply created in said supply plan; and
b) computerized modifying said supply plan address said shortage.

22. The method of claim 14 further comprising the steps of
a) computerized determining of a remainder of the supply following implementation of the supply plan, and
b) computerized accessing of feasibility of a new order using the remainder.

23. A program storage device readable by a machine, tangibly embodying a program of instructions executable by a machine to perform method for selecting an optimal supply allocation plan for a component, said method comprising the steps of:
a) forming an electronically readable component database containing information related to a supply of the component, said information describing the supply and changes to the supply;
b) using synchronized allocation and matched sets logic with the information in the component database to produce a plurality of proposed supply plans for said component, wherein each of said proposed supply plans has associated supply plan values comprising:

$a_i$ representing a revenue associated with a demand i, $\beta_i$ representing a margin associated with said demand i, $c_j$ representing a standard cost of an item j, $u_{jkt}$ representing a quantity of consumed inventory, $t_{jk}$ representing a quantity of issued inventory, $I_{jt}$ representing an inventory of an item j at end of a time period t, M representing a number of independent demands, and T representing a number of time periods;

c) accepting user input and using said user input to define user preference values comprising $\omega_{CS}$, $\omega_R$, $\omega_M$, and $\omega_I$ representing weightings for customer service, revenue margin, and inventory for said component, $\gamma_{CS}$, $\gamma_R$, $\gamma_M$, and $\gamma_I$ representing scaling factors for customer service, revenue, margin, and inventory for said component, and $\delta_{it}$ representing a scaling factor to give preference for shipping orders on-time versus shipping late or early, d) evaluating the plurality of proposed supply chain plans using the associated supply plan values and the user preference values through an objective function comprising:

$$\left[\omega_{cs}\gamma_{cs}\sum_{i=1}^{M}\sum_{t=1}^{T}\delta_{it}x_{it} + \omega_R\gamma_R\sum_{i=1}^{M}\left(\alpha_i\sum_{t=1}^{T}x_{it}\right) + \omega_M\gamma_M\sum_{i=1}^{M}\left(\beta_i\sum_{t=1}^{T}x_{it}\right) - \omega_I\gamma_I\left(\sum_{j=1}^{M}\left(c_j\sum_{t=1}^{T}I_{jt}\right) + \sum_{j=1}^{M}\left(c_j\sum_{k=1}^{T}\left(t_{jk}-\sum_{t=1}^{T}u_{jkt}\right)\right)\right)\right],$$

where $x_{it}$ is a binary variable, and e) selecting the optimal supply plan from the proposed plurality of proposed supply chain plans, wherein the optimal supply plan maximizes the objective function.

24. The program storage device readable of claim 23, wherein the method steps performed by said program on instructions further comprise said machine automatically defining the component by using an engineering specification.

25. The program storage device readable of claim 23, wherein the performed method steps performed by said program instructions further comprise:

a) said machine automatically identifying a shortage in the supply created in said supply plan; and
b) said machine automatically modifying said supply plan to address said shortage.

* * * * *